E US008811332B2

(12) United States Patent
Yin et al.

(10) Patent No.: US 8,811,332 B2
(45) Date of Patent: Aug. 19, 2014

(54) SYSTEMS AND METHODS FOR CARRIER AGGREGATION

(71) Applicant: Sharp Laboratories of America, Inc., Camas, WA (US)

(72) Inventors: Zhanping Yin, Vancouver, WA (US); Shohei Yamada, Camas, WA (US); John Michael Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 106 days.

(21) Appl. No.: 13/665,558

(22) Filed: Oct. 31, 2012

(65) Prior Publication Data

US 2014/0119246 A1    May 1, 2014

(51) Int. Cl.
*H04Q 7/00* (2006.01)
*H04J 4/00* (2006.01)

(52) U.S. Cl.
USPC ............................... 370/330; 370/478

(58) Field of Classification Search
USPC ................ 370/328–330, 338, 436, 478
See application file for complete search history.

(56) References Cited

U.S. PATENT DOCUMENTS

| | | | |
|---|---|---|---|
| 2011/0103243 A1 | 5/2011 | Larsson | |
| 2011/0267978 A1 | 11/2011 | Etemad | |
| 2011/0268045 A1* | 11/2011 | Heo et al. | 370/329 |
| 2011/0317597 A1 | 12/2011 | Wan | |
| 2012/0106404 A1 | 5/2012 | Damnjanovic | |
| 2012/0113831 A1* | 5/2012 | Pelletier et al. | 370/252 |
| 2012/0120849 A1 | 5/2012 | Kazmi | |
| 2012/0230268 A1* | 9/2012 | Marinier et al. | 370/329 |
| 2014/0029528 A1* | 1/2014 | Han et al. | 370/329 |

OTHER PUBLICATIONS

International Search Report issued for International Patent Application No. PCT/JP2013/006214 on Nov. 19, 2013.
Sharp, "PDSCH HARQ-ACK report with LTE TDD inter-band CA," 3GPP TSG-RAN WG1 #68, R1-120274, Dresden, Germany, Feb. 6-12, 2012.
Huawei, HiSilicon "HARQ timing design for TDD inter-band CA with different UL-DL configuration," 3GPP TSG-RAN WG1 Meeting #68, R1-120017, Dresden, Germany, Feb. 6-10, 2012.
Nokia Corporation, Nokia Siemens Networks, "New WI: Further LTE Carrier Aggregation Enhancements," 3GPP TSG-RAN WG1 #58, RP-121810, Barcelona, Spain, Dec. 4-7, 2012.
3GPP TS 36.211 V9.0.0, "Evolved Universal Terrestrial Radio Access (E-UTRA); Physical Channels and Modulation (Release 9)," Dec. 2009.
3GPP TS 36.213 V8.6.0, "Evolved Universal Terrestrial Radio Access (E-UTRA); Physical Layer Procedures (Release 8)," Mar. 2009.

\* cited by examiner

*Primary Examiner* — Hong Cho
(74) *Attorney, Agent, or Firm* — Austin Rapp & Hardman

(57) ABSTRACT

A User Equipment (UE) for performing carrier aggregation is described. The UE includes a processor and instructions stored in memory that is in electronic communication with the processor. The UE determines an uplink control information (UCI) transmission cell in a wireless communication network with at least one frequency-division duplexing (FDD) cell and at least one time-division duplexing (TDD) cell. The UE also selects a first cell for FDD and TDD carrier aggregation. The UE further determines a set of downlink subframe associations for the first cell that indicate at least one UCI transmission uplink subframe of the UCI transmission cell. The UE additionally sends Physical Downlink Shared Channel (PDSCH) Hybrid Automatic Repeat Request Acknowledgement/Negative Acknowledgement (HARQ-ACK) information in the UCI transmission uplink subframe of the UCI transmission cell.

30 Claims, 13 Drawing Sheets

SYSTEMS AND METHODS FOR CARRIER AGGREGATION

TECHNICAL FIELD

The present disclosure relates generally to communication systems. More specifically, the present disclosure relates to systems and methods for carrier aggregation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
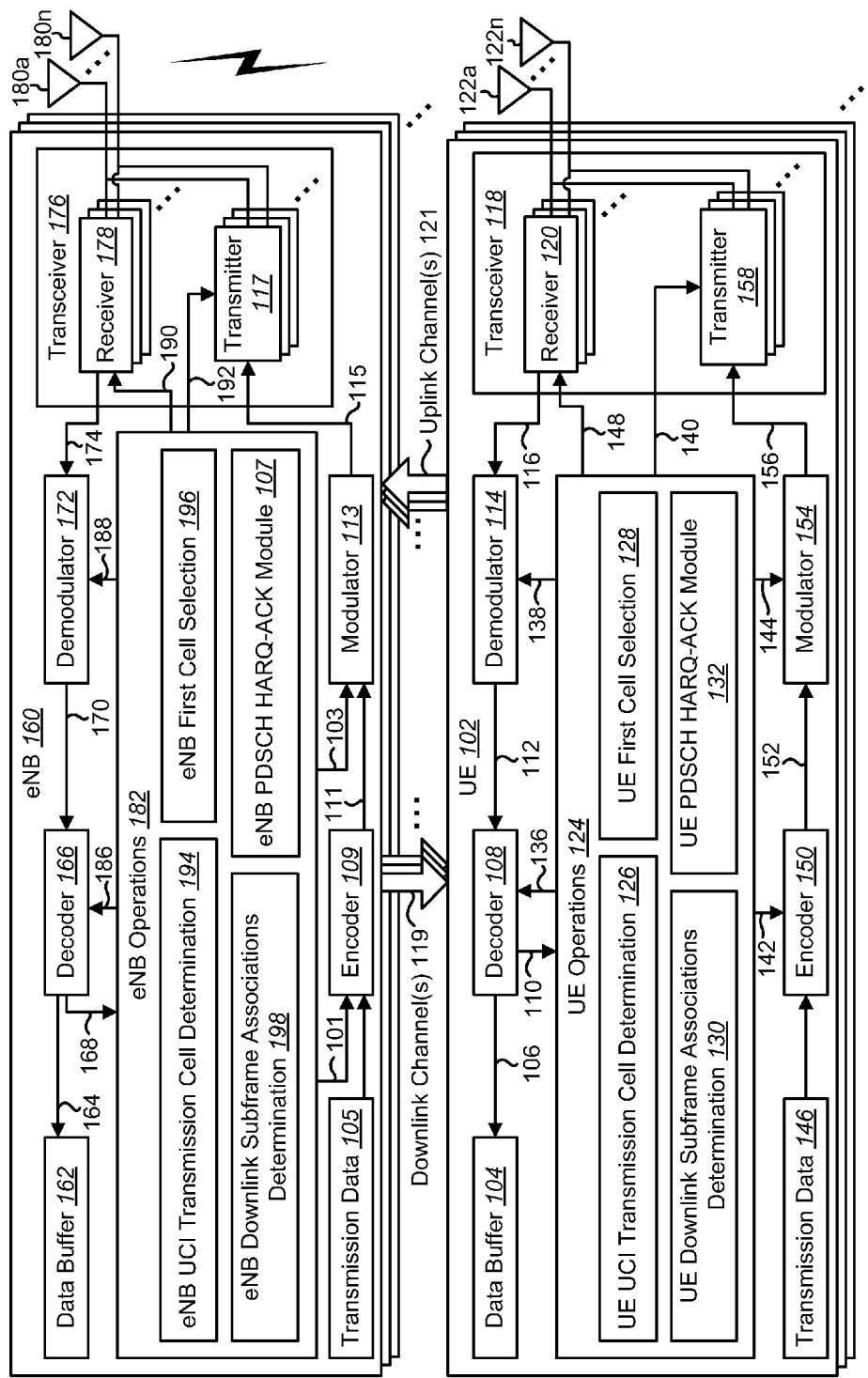
FIG. 1 is a block diagram illustrating one configuration of one or more evolved Node Bs (eNBs) and one or more User Equipments (UEs) in which systems and methods for carrier aggregation may be implemented.

A UE for performing carrier aggregation is disclosed. The UE includes a processor and memory that is in electronic communication with the processor. Executable instructions are stored in the memory. The UE determines an uplink control information (UCI) transmission cell in a wireless communication network with at least one FDD cell and at least one TDD cell. The UE also selects a first cell for FDD and TDD carrier aggregation. The UE further determines a set of downlink subframe associations for the first cell that indicate at least one UCI transmission uplink subframe of the UCI transmission cell. The UE additionally sends Physical Downlink Shared Channel (PDSCH) Hybrid Automatic Repeat Request Acknowledgement/Negative Acknowledgement (HARQ-ACK) information in the UCI transmission uplink subframe of the UCI transmission cell.

The UE may also determine a PDSCH scheduling for the first cell. The PDSCH scheduling may include cross-carrier scheduling. The scheduling of the first cell may be based on a scheduling cell timing. The PDSCH scheduling for the first cell may occur in a downlink allocation subframe of the scheduling cell. The scheduling cell may be a TDD cell. The UE may also determine a Physical Uplink Shared Channel (PUSCH) scheduling and PUSCH HARQ-ACK associations for the first cell.

The set of downlink subframe associations for the first cell may include a PDSCH association timing of the UCI transmission cell. The UCI transmission cell may be a FDD cell and the first cell may be a TDD cell.

Determining the set of downlink subframe associations for the first cell may include maintaining a PDSCH association timing of the first cell. The UCI transmission cell may be a FDD cell and the first cell may be a TDD cell.

The UE may additionally determine a primary cell (PCell). The PCell may be a TDD cell and the UCI transmission cell may be a reference cell. The reference cell may be a FDD cell.

The UE may also determine a second UCI transmission cell for UCI transmission. The UCI transmission cell and second UCI transmission cell may utilize different duplexing. The UE may additionally send PDSCH HARQ-ACK information in the UCI transmission uplink subframe of the UCI transmission cell. The PDSCH HARQ-ACK information for the FDD cell may be sent by the UCI transmission cell and the PDSCH HARQ-ACK information for the TDD cell may be sent by the second UCI transmission cell. The PDSCH HARQ-ACK information may be sent on one of a Physical Uplink Control Channel (PUCCH) or a PUSCH.

An eNB for performing carrier aggregation is also described. The eNB includes a processor and memory that is in electronic communication with the processor. Executable instructions are stored in the memory. The eNB determines an UCI transmission cell in a wireless communication network with at least one FDD cell and at least one TDD cell. The eNB also selects a first cell for FDD and TDD carrier aggregation. The eNB further determines a set of downlink subframe associations for the first cell that indicate at least one UCI transmission uplink subframe of the UCI transmission cell. The eNB additionally receives PDSCH HARQ-ACK information in the UCI transmission uplink subframe of the UCI transmission cell.

A method for performing carrier aggregation by a UE is also described. The method includes determining an UCI transmission cell in a wireless communication network with at least one FDD cell and at least one TDD cell. The method also includes selecting a first cell for FDD and TDD carrier aggregation. The method further includes determining a set of downlink subframe associations for the first cell that indicate at least one UCI transmission uplink subframe of the UCI transmission cell. The method additionally includes sending PDSCH HARQ-ACK information in the UCI transmission uplink subframe of the UCI transmission cell.

A method for performing carrier aggregation by an eNB is also described. The method includes determining an UCI transmission cell in a wireless communication network with at least one FDD cell and at least one TDD cell. The method also includes selecting a first cell for FDD and TDD carrier aggregation. The method further includes determining a set of downlink subframe associations for the first cell that indicate at least one UCI transmission uplink subframe of the UCI transmission cell. The method additionally includes receiving PDSCH HARQ-ACK information in the UCI transmission uplink subframe of the UCI transmission cell.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a PDSCH. "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe carrier aggregation. In some configurations, the systems and methods disclosed herein describe LTE enhanced carrier aggregation (eCA) with hybrid duplexing. For example, association timings are described for a case when a PCell is configured with frequency division duplexing (FDD) and a secondary cell (SCell) is configured with time division duplexing (TDD). Additionally, association timings for a case when a PCell is configured with TDD and a SCell is configured with FDD are also described.

Currently, there are two LTE duplex systems, FDD and TDD. However, under current approaches, FDD and TDD systems cannot work together for CA. For example, under known approaches (e.g., LTE Rel-10 (hereafter "Rel-10")) and proposed approaches (e.g., LTE Rel-11 (hereafter "Rel-11")), carrier aggregation (CA) is allowed for either multiple FDD cells, or multiple TDD cells, but not a hybrid of both types of cells.

Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL-DL) configuration has to be used for TDD CA in Rel-10, and for intra-band CA in Rel-11. In Rel-11, inter-band TDD CA with different TDD UL-DL configurations is supported. The inter-band TDD CA with different TDD UL-DL configurations may provide the flexibility of a TDD network in CA deployment. Furthermore, enhanced interference management with traffic adaptation (eIMTA) may allow flexible TDD UL-DL reconfiguration based on the network traffic load. However, CA in a hybrid duplexing network (e.g., a network with both FDD and TDD cells) is not supported in any current approach. It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

A FDD cell requires spectrum (e.g., radio communication frequencies) in which contiguous subsets of the spectrum are entirely allocated to either UL or DL but not both. Accordingly, FDD may or may not have carriers that are paired (e.g., may DL than UL carriers). However, TDD may allocate UL and DL resources on the same carrier frequency. Therefore, TDD may provide more flexibility on spectrum usage. With the increase in wireless network traffic, and as spectrum resources become very precious, new allocated spectrum tends to be fragmented and has smaller bandwidth, which is more suitable for TDD and/or small cell deployment. Furthermore, TDD may provide flexible channel usage through traffic adaptation with different TDD UL-DL configurations and dynamic DL-UL re-configuration.

The systems and methods described herein include carrier aggregation (CA) under the same scheduler control, with a macro cell and a small cell (e.g., femtocell, picocell, microcell, etc.) heterogeneous network scenario. For the LTE network deployment, most carriers choose FDD-LTE; however, TDD-LTE is becoming more and more important in many markets. A TDD implementation may provide flexibility for small cells with fast traffic adaptation.

With TDD CA and hybrid duplexing networks, the macro cells and small cells may use different frequency bands. A frequency band is a small section of the spectrum, in which communication channels may be established. For example, in a typical CA case, the macro cell may use a lower frequency band and the small cell may use a higher frequency band. For hybrid duplexing networks, a possible combination is to have FDD on a macro cell and TDD on a small cell. Therefore, to allow seamless operation, two pairs of association timings are important for CA in a hybrid duplexing network: (1) Physical downlink shared channel (PDSCH) scheduling and PDSCH HARQ-ACK reporting, and (2) Physical uplink shared channel (PUSCH) scheduling and PUSCH HARQ-ACK timing.

The PDSCH scheduling and PUSCH scheduling may be performed by corresponding PDCCH formats. The systems and methods disclosed herein may be used for UEs that conform to proposed Rel-11 and future LTE specifications. For example, a PDCCH or an enhanced PDCCH (ePDCCH) may be used to schedule PDSCH and/or PUSCH transmissions. The PDSCH HARQ-ACK of CA cells may be reported on a PUCCH or PUSCH of one cell or multiple cells if supported. The PUSCH HARQ-ACK may be signaled on a physical hybrid automatic repeat request (ARQ) indicator channel (PHICH), a PDCCH or an ePDCCH. For UE conforming to the proposed Rel-11 and future LTE specifications, the enhanced PDCCH (ePDCCH) and/or enhanced PHICH (ePHICH) may also be used for PUSCH HARQ-ACK feedback.

In one implementation, a PCell may be a macro cell that may be configured with FDD, and a SCell may be a small cell (e.g., a picocell) that may be configured with TDD. A hybrid duplex CA may include at least one cell (or carrier) with FDD, and at least one cell (or carrier) with TDD. This implementation (e.g., a FDD PCell and a TDD SCell) may be further divided into two cases: self-scheduling and cross-carrier scheduling.

PDSCH scheduling for CA in a hybrid duplexing network may be performed as follows. For PDSCH self-scheduling, the PDSCH transmission on a cell may be indicated by a corresponding PDCCH (or ePDCCH) on the same cell in the same subframe (e.g., the same transmission time interval (TTI)), or for a PDCCH (or ePDCCH) on the same cell in the same subframe indicating a downlink semi-persistent scheduling (SPS) release. Because all PDSCH transmissions may be scheduled on the PDCCH (or ePDCCH) of the same cell in self-scheduling, the same technique may be used for hybrid duplexing networks. In other words, in hybrid duplexing networks, self-scheduling for PDSCH transmission may be performed by a corresponding PDCCH (or ePDCCH) on the same cell in the same subframe.

With cross-carrier scheduling, a PDSCH transmission on a cell may be scheduled by a PDCCH (or an ePDCCH) on another cell. With hybrid duplexing networks, if the scheduling cell is a FDD cell and the scheduled cell is a TDD cell, the PDSCH transmission can always be cross-carrier scheduled by the FDD scheduling cell. In other words, in cross-carrier scheduling, the PDSCH scheduling may follow the scheduling cell timing.

On the other hand, with hybrid duplexing networks, if the scheduling cell is a TDD cell and the scheduled cell is a FDD cell, a PDSCH transmission may be cross-carrier scheduled with some constraints. In one implementation, the PDSCH transmission on the scheduled cell may be cross-carrier scheduled in the subframes where DL is allocated on the scheduling TDD cell. Therefore, with cross-carrier scheduling, PDSCH scheduling of the scheduled cell may occur in a downlink allocation subframe of the scheduling cell.

PUSCH scheduling and PUSCH HARQ-ACK may be performed as follows. For PUSCH self-scheduling, the eNB may schedule a PDCCH (or ePDCCH) with a downlink control information (DCI) format 0/4 and/or a PHICH (or ePHICH) transmission on a serving cell in a DL subframe intended for a UE. The UE may adjust the corresponding PUSCH transmission in subframe n+k based on the PDCCH (or ePDCCH) and PHICH (or ePHICH) information, where k may be 4 for FDD and k may be decided by the TDD UL-DL configurations of the TDD cells. The PUSCH HARQ-ACK report may be associated with the PUSCH transmission by a PHICH (or ePHICH) or PDCCH (or ePDCCH) on the same cell following the corresponding association timing. Because the PUSCH may be scheduled on the PDCCH (or ePDCCH) of the same cell in self-scheduling, the same techniques may be used for PUSCH scheduling and PUSCH HARQ-ACK reporting in hybrid duplexing networks.

With cross-carrier scheduling, PUSCH scheduling and PUSCH HARQ-ACK reporting may follow a scheduling cell timing. For example, the PUSCH transmission on a cell may be scheduled by an UL grant or PHICH (or ePHICH) feedback from another cell. With hybrid duplexing networks, if the scheduling cell is a FDD cell and the scheduled cell is a TDD cell, the PUSCH transmission may be cross-carrier scheduled.

In one implementation, because UL may be allocated in all subframes of the scheduling FDD cell, the scheduled TDD cell may always be cross-carrier scheduled with the FDD cell timing on PUSCH scheduling and PUSCH HARQ-ACK reporting. For example, a fixed 4 millisecond (ms) PUSCH scheduling and the feedback association timing of a FDD cell may be used to cross-carrier schedule a TDD cell.

In another implementation, the PUSCH scheduling and PUSCH HARQ-ACK reporting timing of a TDD cell may be used for the cross-carrier scheduling by a scheduling FDD cell. This approach ensures the same PUSCH scheduling and PUSCH HARQ-ACK timing for both self-scheduling and cross-carrier scheduling cases.

On the other hand, with a hybrid duplexing network in which the scheduling cell is a TDD cell and the scheduled cell is a FDD cell, the PUSCH transmission may be cross-carrier scheduled with some constraints. The scheduled FDD cell may follow the scheduling TDD cell timing on PUSCH scheduling and HARQ-ACK reporting. But the subframes with DL allocation in the TDD scheduling cell may not be able to schedule PUSCH transmission on the scheduled FDD cell. For example, the FDD cell may have a fixed turnaround time of 8 ms for PUSCH scheduling and HARQ-ACK reporting, but all TDD UL-DL configurations have at least 10 ms turnaround time. Therefore, the FDD cell timing cannot be applied for PUSCH scheduling and HARQ-ACK reporting for CA in a hybrid duplexing network with cross-carrier scheduling when the scheduling cell is a TDD cell and the scheduled cell is FDD.

Additionally, for CA in a hybrid duplexing network with more than 2 cells, a reference cell for PUSCH cross-carrier scheduling and PUSCH HARQ-ACK reporting may be used. For example, if the PCell is a TDD cell, a FDD cell may be configured as a reference cell for PUSCH cross-carrier scheduling and PUSCH HARQ-ACK reporting.

PDSCH HARQ-ACK reporting for CA in a hybrid duplexing network may be scheduled as follows. The PDSCH HARQ-ACK reporting for FDD and TDD networks are very different. With FDD, the HARQ-ACK for PDSCH transmission in subframe n may be reported in subframe n+4 on a PUCCH or PUSCH transmission. However, with TDD, the PDSCH HARQ-ACK may only be reported on subframes with an UL allocation. Therefore, with TDD, an UL subframe may be associated with more than one DL subframe for PDSCH HARQ-ACK reporting. Accordingly, multi-cell HARQ-ACK reporting for CA in hybrid duplexing networks may be specified.

PDSCH HARQ-ACK reporting for CA in a hybrid duplexing network may include reporting the PDSCH HARQ-ACK information on the PUCCH on one cell only. For example, the PDSCH HARQ-ACK information may be reported on the PUCCH of the PCell. In Rel-10 and Rel-11, the PUCCH may be reported on the PCell for FDD CA and TDD CA with the same or different TDD UL-DL configurations. The PUCCH may also be reported on the PCell for CA in a hybrid duplexing network.

In one implementation, if the PCell is configured with FDD, the FDD PDSCH association timing may be applied to all TDD cells. For example, a TDD cell may follow the timing of a FDD cell in PDSCH HARQ-ACK reporting for CA in a hybrid duplexing network. Because a DL is available in all subframes on a FDD cell, the PDSCH HARQ-ACK information on a TDD cell may always be reported on a corresponding UL of a FDD cell (e.g., a PCell). Therefore, a TDD cell may be treated as a half-duplex FDD cell that operates on a single frequency carrier instead of separate frequency carriers for the UL and DL. In other words, the downlink subframe associations for the TDD cells may follow the PDSCH association timing of an FDD cell.

This implementation may be applied regardless of the number of TDD cells and the TDD UL-DL configurations of the TDD cells. Furthermore, this implementation may provide flexible TDD UL-DL reconfiguration without changing of association timings. Therefore, this implementation may provide better support for enhanced interference management with traffic adaption (eIMTA).

This approach may provide simple and consistent timing for CA in a hybrid duplexing network that may employ different UL-DL configurations. Furthermore, the PDSCH HARQ-ACK payload may be smaller and more evenly distributed to all UL subframes. With this implementation, CA in a hybrid duplexing network may be treated as a special case of CA in a FDD network.

For a cross-carrier scheduling case where the scheduling cell is configured with FDD and the scheduled cell is configured with TDD, this implementation may allow for the scheduling cell timing to be applied on the scheduled cell. This implementation may also be used for self-scheduling.

Besides the PDSCH HARQ-ACK, the channel state information (CSI) reports of FDD and TDD cells may also be reported on the PUCCH of the PCell only. UCI, including CSI and the PDSCH HARQ-ACK, may also be reported on the PUSCH of an allocated cell with the lowest Cell_ID.

In another implementation, each cell in a hybrid duplexing network may follow its own timing. In an UL subframe n, the PDSCH HARQ-ACK bits of all cells may be generated based on each cell's own association timings. The PDSCH HARQ-ACK bits of all cells may then be multiplexed and reported on the PUCCH on the PCell. In the case where the PUSCH is scheduled in subframe n, the PDSCH HARQ-ACK bits may be multiplexed on the PUSCH of the cell with the lowest Cell_ID.

If a PCell is configured with FDD, a TDD SCell may maintain its own PDSCH association timing. For example, in the case where a PCell is configured with FDD, an UL subframe is available in every subframe. Therefore, in one implementation of CA in a hybrid duplexing network, a TDD cell following its own PDSCH HARQ-ACK timing may always report the PDSCH HARQ-ACK on an UL on the PCell. In other words, when determining a set of downlink subframe associations for the TDD SCell, the TDD SCell may maintain the PDSCH association timing of the TDD SCell.

This implementation may be applied even if the hybrid duplexing network may include multiple TDD cell with the same or different TDD UL-DL configurations. This approach may result in unbalanced PDSCH HARQ-ACK payload in different UL subframes. In a subframe where a TDD cell is allocated with UL, the PUCCH or PUSCH reporting may carry more HARQ-ACK bits than a subframe where the TDD cell is allocated with DL.

For PDSCH transmissions with self-scheduling, this implementation may maintain the PDSCH HARQ-ACK timing of each cell. The PDSCH HARQ-ACK bits may be multiplexed and reported on the PUCCH on the PCell. For cross-carrier scheduling, this implementation may also be applied. In one case, a scheduling cell PDSCH HARQ-ACK timing may be used for PDSCH transmissions with cross-carrier scheduling. In another case, the scheduled cell PDSCH HARQ-ACK timing may be used for PDSCH transmissions with cross-carrier scheduling.

In yet another implementation of PDSCH HARQ-ACK reporting for CA in a hybrid duplexing network, a reporting cell may be used if a PCell is a TDD cell. It should be noted that the macro cell and small cell configuration does not necessarily mean the PCell is the macro cell and SCell is a small cell. In some cases, the PCell may be the small cell and the SCell may be the macro cell. Therefore, though the systems and methods above are discussed mainly for the case where a PCell may be configured with FDD and a SCell may be configured with TDD, in another implementation, the PCell may be configured with TDD and the SCell may be configured with FDD.

FDD timing is simple and consistent, compared with TDD timing, which is different for different TDD UL-DL configurations that may appear in a set of small cells affiliated with, or spatially relevant with, an area associated with a larger cell. Therefore, it may be better to use a FDD (larger) cell to report the UCI (e.g., PDSCH HARQ-ACK and CSI). Therefore, for CA in a hybrid duplexing network, a FDD cell may be configured as a PDSCH HARQ-ACK reporting cell (also denoted as a reference cell) even if the PCell is a TDD cell. In other words, the PDSCH HARQ-ACK reporting may be on a SCell that is configured with FDD. The PDSCH HARQ-ACK reporting cell or reference cell may be the UCI reporting cell (e.g., the UCI transmission cell) or reference cell so that all UCI is reported on the UCI reporting cell. The UCI may include HARQ-ACK and channel state information (CSI). The CSI may include channel quality indicator (CQI) and/or rank indication (RI) and/or precoding matrix indicator (PMI) and/or precoding type indicator (PTI) etc.

In another implementation, a PDSCH HARQ-ACK reporting cell or UCI reporting cell may be implicitly decided as the FDD cell with the lowest Cell_ID. Additionally, the PDSCH HARQ-ACK reporting cell or UCI reporting cell may be configured by physical (PHY) layer signaling (e.g., in the synchronization, broadcasting signals, system information block (SIB) 1 and/or SIB messages). Furthermore, the PDSCH HARQ-ACK reporting cell or UCI reporting cell may be configured by higher layer signaling (e.g., radio resource control (RRC) signaling). Therefore, the PDSCH HARQ-ACK of all cells may be reported on the PUCCH or PUSCH of the configured reporting cell.

PDSCH HARQ-ACK reporting for CA in a hybrid duplexing network may also be separate and independent for FDD cells and TDD cells. In other words, cells for each duplex may maintain independent PUCCH and/or PUSCH reports.

TDD and FDD systems have very different PDSCH HARQ-ACK association timings. Also, there are considerable differences on the PDCCH (or ePDCCH) formats and CSI estimation and reports. Therefore, in an implementation of CA in a hybrid duplexing network, the FDD cells and TDD cells may maintain separate and independent PDSCH HARQ-ACK reporting and CSI feedback mechanisms. For example, one FDD cell may be configured as the PCell (or anchor cell) for all FDD cells, and one TDD cell may be configured as the PCell (or anchor cell) for all TDD cells. The FDD cells may perform CA as in Rel-10/11, and the TDD cells may perform CA as in Rel-10 if all TDD cells have the same TDD UL-DL configuration or the TDD cells may perform CA as in Rel-11 if different TDD UL-DL configurations are used in the TDD cells. Therefore, if the PCell is a macro cell with FDD and the SCell is a small cell with TDD, the small cell may perform PUCCH reporting that is separate and independent from the macro cell.

In a hybrid duplexing network, the PCell may be a FDD cell or a TDD cell. The FDD PCell and the TDD PCell may be the PCell or a SCell configured to perform CA in a hybrid duplexing network. The FDD PCell may also be configured as a FDD anchor cell. Furthermore, the TDD PCell may also be configured as a TDD anchor cell. The FDD PCell (or FDD anchor cell) or the TDD PCell (or TDD anchor cell) may be the PCell or the secondary PCell.

Therefore, a PUCCH on the FDD PCell may be used to report PDSCH HARQ-ACK for all FDD cells, and a PUCCH on the TDD PCell may be used to report PDSCH HARQ-ACK information for all TDD cells. Therefore, in CA with hybrid duplexing networks, PUCCH reporting on a SCell may be supported, where the given SCell may operate as an anchor cell or secondary PCell.

In a subframe where UCI (e.g., PDSCH HARQ-ACK information and/or CSI) is reported for the FDD cells only, the UCI may be reported on the PUCCH of the FDD PCell. In a subframe where UCI (e.g., PDSCH HARQ-ACK information and/or CSI) is reported for the TDD cells only, the UCI may be reported on the PUCCH of the TDD PCell.

Two implementations may be used to report PDSCH HARQ-ACK bits on both FDD cells and TDD cells in the same subframe. In one implementation, multiple PUCCHs may be reported simultaneously on the FDD PCell (or FDD anchor cell) and the TDD PCell (or TDD anchor cell). In another implementation, only one PUCCH may be reported, and the PDSCH HARQ-ACK bits of both the FDD and TDD cells may be multiplexed and reported on the PUCCH of the PCell only.

With independent reporting for FDD and TDD cells, the PDSCH HARQ-ACK information or CSI may also be reported on a PUSCH. In one implementation, the PDSCH HARQ-ACK information and CSI of all FDD cells may be reported on an allocated PUSCH of the FDD cell with the lowest Cell_ID. The PDSCH HARQ-ACK information and/or CSI of all TDD cells may also be reported on an allocated PUSCH of the TDD cell with the lowest Cell_ID. In another implementation, the PDSCH HARQ-ACK information and/or CSI reporting for FDD cells and the PDSCH HARQ-ACK information and/or CSI reporting for TDD cells may use different channel formats. For example, the PDSCH HARQ-ACK information and CSI of FDD cells may be reported on a PUCCH and the PDSCH HARQ-ACK information and CSI of TDD cells may be reported on a PUSCH, and vice versa. In yet another implementation, the PDSCH HARQ-ACK information and CSI of all FDD and TDD cells may be multiplexed together and reported on the allocated PUSCH of the cell with the lowest Cell_ID.

It should be noted that independent reporting (on PUCCH or PUSCH) by FDD and TDD cells may be used if the PCell is configured with either FDD or TDD. Furthermore, it should be noted that independent reporting (on PUCCH or PUSCH) by FDD and TDD cells may be applied to both self-scheduling and cross-carrier scheduling.

The systems and methods disclosed herein may provide the following benefits. CA in a hybrid duplexing network that includes FDD and TDD cells may operate seamlessly. Resource use may be flexible when both FDD and TDD are used by a UE. HARQ-ACK reporting methods may support the dynamic UL-DL reconfiguration of TDD cells. Independent uplink control information (UCI) reporting on a PUCCH or a PUSCH may be performed by carriers with different duplexing methods. Standalone operations for carriers with different duplexing methods may be supported. The use of a FDD cell timing on a TDD cell in a hybrid CA scenario may be supported. Additionally, a reporting cell (or reference cell) implementation by physical (PHY) layer signaling, implicit signaling and/or higher layer signaling may be supported.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more eNBs 160 and one or more UEs 102 in which systems and methods for carrier aggregation may be implemented. The one or more UEs 102 communicate with one or more eNBs 160 using one or more antennas 122*a-n*. For example, a UE 102 transmits electromagnetic signals to the eNB 160 and receives electromagnetic signals from the eNB 160 using the one or more antennas 122*a-n*. The eNB 160 communicates with the UE 102 using one or more antennas 180*a-n*.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE UCI transmission cell determination module 126, a UE first cell selection module 128, a UE downlink subframe associations determination module 130 and a UE PDSCH HARQ-ACK module 132.

The UE UCI transmission cell determination module 126 may determine a cell that may transmit UCI information between the UE 102 and the eNB 160. Examples of UCI include PDSCH HARQ-ACK information and CSI. The UCI transmission cell may be either a FDD cell or a TDD cell. Therefore, the UE UCI transmission cell determination module 126 may determine a UCI transmission cell that is either a FDD or a TDD cell. In one implementation, the UE UCI transmission cell determination module 126 may select which cell may be the UCI transmission cell. In another implementation, the UE UCI transmission cell determination module 126 may be instructed (by the eNB 160, for example) which cell to use for the UCI transmission. For example, the UE 102 may receive an indicator from the eNB 160 that indicates one or more cells for UCI transmission. Accordingly, the UE UCI transmission cell determination module 126 may determine one or more cells for UCI transmission based on (e.g., indicated by) the indicator. The UCI transmission cell may include a communication channel 119, 121 between the UE 102 and an eNB 160 for transmitting UCI.

In one implementation, the UE UCI transmission cell determination module 126 may determine that the UCI transmission cell is a FDD cell. In one example, the UE UCI transmission cell determination module 126 may determine that the UCI transmission cell is a PCell configured with FDD. In this example, the UCI may be sent on one cell only (e.g., a PCell) for all of the CA cells (e.g., the FDD cell(s) and TDD cell(s)) in the hybrid duplexing network.

In another implementation, the UE UCI transmission cell determination module 126 may determine that the UCI transmission cell is a FDD reporting cell. For example, the PCell may be a TDD cell, and the UCI transmission cell may be a reporting cell configured with FDD.

In yet another implementation, the UE UCI transmission cell determination module 126 may determine a UCI transmission cell and a second UCI transmission cell that utilize different duplexing. For example, the UE UCI transmission cell determination module 126 may determine a UCI transmission cell for one or more FDD cells, and the UE UCI transmission cell determination module 126 may also determine a separate second UCI transmission cell for one or more TDD cells. In this implementation, the UCI transmission cell for the FDD cells may be a FDD anchor cell, and the second UCI transmission cell for the TDD cells may be a TDD anchor cell.

The UE first cell selection module 128 may select a cell for FDD and TDD carrier aggregation. In one implementation, the UE first cell selection module 128 may select a TDD cell that may be included with the UCI transmission cell in performing CA. Alternatively, the UE first cell selection module 128 may select a FDD cell that may be included with the UCI transmission cell in performing CA. In some implementations, the UE first cell selection module 128 may determine the cell for FDD and TDD carrier aggregation based on an indicator (from the eNB 160) that indicates the cell for FDD and TDD carrier aggregation.

The UE downlink subframe associations determination module 130 may determine a set of downlink subframe associations for the first cell that indicate at least one UCI transmission uplink subframe of the UCI transmission cell. The set of downlink subframe associations may include timings (e.g., PDSCH HARQ-ACK associations) that correspond to a UCI transmission uplink subframe. In some implementations, the UE downlink subframe associations determination module 130 may determine the set of downlink subframe associations based on an indicator (from the eNB 160) that indicates the set of downlink subframe associations.

In one implementation, the UE downlink subframe associations determination module 130 may determine that the set of downlink associations for the first cell may include the PDSCH association timing of the UCI transmission cell. For example, if the UCI transmission cell is a FDD cell and the first cell is a TDD cell, the first cell may follow the association timing of a FDD cell.

In another implementation, the UE downlink subframe associations determination module 130 may determine that the set of downlink subframe associations for first cell may include maintaining the PDSCH association timing of the first cell. For example, if the UCI transmission cell is a FDD cell and the first cell is a TDD cell, the first cell may maintain its own PDSCH association timing. Therefore, the first cell may use a TDD UL-DL configuration as described below in connection with FIG. 5 and FIG. 6.

The UE PDSCH HARQ-ACK module 132 may send PDSCH HARQ-ACK information in the UCI transmission uplink subframe of the UCI transmission cell. For example, the UE PDSCH HARQ-ACK module 132 may send PDSCH HARQ-ACK information in the UCI transmission uplink subframe corresponding to the set of downlink subframe associations. For instance, the UE PDSCH HARQ-ACK module 132 may inform the transmitter(s) 158 when or when not to send PDSCH HARQ-ACK information based on the set of downlink subframe associations.

In one implementation, the UE PDSCH HARQ-ACK module 132 may send PDSCH HARQ-ACK information on the PUCCH or PUSCH of one cell only. For example, the UE PDSCH HARQ-ACK module 132 may send PDSCH HARQ-ACK information for all cells (including the first cell) on the PUCCH of a UCI transmission cell that is a FDD cell.

In another implementation, the UE PDSCH HARQ-ACK module 132 may send PDSCH HARQ-ACK information to multiple cells. For example, where the FDD and TDD cells may have separate UCI transmission cells, the UE PDSCH HARQ-ACK module 132 may concurrently send PDSCH HARQ-ACK information in a UCI transmission uplink subframe to the UCI transmission cell for the FDD cells and to the second UCI transmission cell for the TDD cells. In other words, PDSCH HARQ-ACK information for the FDD cells may be sent by the UCI transmission cell and the PDSCH HARQ-ACK information for the TDD cells may be sent by the second UCI transmission cell.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158.

For example, the UE operations module 124 may instruct the one or more transmitters 158 when to transmit a signal to the eNB 160. In some configurations, this may be based on the UE downlink subframe associations determination module 130 (based on a UL-DL configuration, for example). For instance, the one or more transmitters 158 may transmit during an UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of eNB UCI transmission cell determination module 194, an eNB first cell selection module 196, an eNB downlink subframe associations determination module 198 and an eNB PDSCH HARQ-ACK module 107.

The eNB UCI transmission cell determination module 194 may determine a cell that may transmit UCI information between the UE 102 and the eNB 160. Examples of UCI include PDSCH HARQ-ACK and CSI. The UCI transmission cell may be either a FDD cell or a TDD cell. Therefore, the eNB UCI transmission cell determination module 194 may determine a UCI transmission cell that is either a FDD or a TDD cell. In one implementation, the eNB UCI transmission cell determination module 194 may select which cell may be the UCI transmission cell. In another implementation, the eNB UCI transmission cell determination module 194 may instruct (the UE 102, for example) which cell is the UCI transmission cell. For example, the eNB UCI transmission cell determination module 194 may generate and send an indicator that indicates one or more cells for UCI transmission. The UCI transmission cell may include a communication channel 119, 121 between the UE 102 and an eNB 160 for transmitting UCI.

In one implementation, the eNB UCI transmission cell determination module 194 may determine that the UCI transmission cell is a FDD cell. Additionally, the eNB UCI transmission cell determination module 194 may determine that the UCI transmission cell is a PCell configured with FDD. In this implementation, the UCI may be received on one cell only (e.g., a PCell) for all of the CA cells (e.g., the FDD cells and TDD cells) in the hybrid duplexing network.

In another implementation, the eNB UCI transmission cell determination module 194 may determine that the UCI transmission cell is a FDD reporting cell. For example, the PCell may be a TDD cell, and the UCI transmission cell may be a reporting cell configured with FDD.

In yet another implementation, the eNB UCI transmission cell determination module 194 may determine a UCI transmission cell and a second UCI transmission cell that utilize different duplexing. For example, the eNB UCI transmission cell determination module 194 may determine a UCI transmission cell for one or more FDD cells, and the eNB UCI transmission cell determination module 194 may also determine a separate second UCI transmission cell for one or more TDD cells. In this implementation, the UCI transmission cell for the FDD cells may be a FDD anchor cell, and the second UCI transmission cell for the TDD cells may be a TDD anchor cell.

The eNB first cell selection module 196 may select a cell for FDD and TDD carrier aggregation. In one implementation, the eNB first cell selection module 196 may select a TDD cell that may be included with the UCI transmission cell in performing CA. Alternatively, the eNB first cell selection module 196 may select a FDD cell that may be included with the UCI transmission cell in performing CA. In some implementations, the eNB first cell selection module 196 may generate and send an indicator (to a UE 102) that indicates the cell for FDD and TDD carrier aggregation.

The eNB downlink subframe associations determination module 198 may determine a set of downlink subframe associations for the first cell that indicate at least one UCI transmission uplink subframe of the UCI transmission cell. The set of downlink subframe associations may include timings (e.g., PDSCH HARQ-ACK associations) that correspond to a UCI transmission uplink subframe. In some implementations, the eNB downlink subframe associations determination module 198 may generate and send an indicator (to a UE 102) that indicates the set of downlink subframe associations.

In one implementation, the eNB downlink subframe associations determination module 198 may determine that the set of downlink associations for the first cell may include the PDSCH association timing of the UCI transmission cell. For example, if the UCI transmission cell is a FDD cell and the first cell is a TDD cell, the first cell may follow the association timing of a FDD cell.

In another implementation, the eNB downlink subframe associations determination module 198 may determine that the set of downlink subframe associations for the first cell may include maintaining the PDSCH association timing of the first cell. For example, if the UCI transmission cell is a FDD cell and the first cell is a TDD cell, the first cell may maintain its own PDSCH association timing. Therefore, the first cell may use a TDD UL-DL configuration as described below in connection with FIG. 5 and FIG. 6.

The eNB PDSCH HARQ-ACK module 107 may receive PDSCH HARQ-ACK information in the UCI transmission uplink subframe of the UCI transmission cell. For example, the eNB PDSCH HARQ-ACK module 107 may receive PDSCH HARQ-ACK information in the UCI transmission uplink subframe corresponding to the set of downlink subframe associations. For instance, the eNB PDSCH HARQ-ACK module 107 may inform the receivers(s) 178 when or when not to receive PDSCH HARQ-ACK information based on the set of downlink subframe associations.

In one implementation, the eNB PDSCH HARQ-ACK module 107 may receive PDSCH HARQ-ACK information on the PUCCH or PUSCH of one cell only. For example, the eNB PDSCH HARQ-ACK module 107 may receive PDSCH HARQ-ACK information for all cells (including the first cell) on the PUCCH of a UCI transmission cell that is a FDD cell.

In another implementation, the eNB PDSCH HARQ-ACK module 107 may receive PDSCH HARQ-ACK information on multiple cells. For example, where the FDD and TDD cells may have separate UCI transmission cells, the eNB PDSCH HARQ-ACK module 107 may concurrently receive PDSCH HARQ-ACK information in a UCI transmission uplink subframe on the UCI transmission cell for the FDD cells and/or on the second UCI transmission cell for the TDD cells.

The eNB operations module 182 may provide information 190 to the one or more receivers 178. For example, the eNB operations module 182 may inform the receiver(s) 178 when or when not to receive PDSCH HARQ-ACK information based on the set of downlink subframe associations.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on an UL-DL configuration. The one or more transmitters 117 may upconvert and transmit the modulated signal(s) 115 to one or more UEs 102.

It should be noted that a DL subframe may be transmitted from the eNB 160 to one or more UEs 102 and that an UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
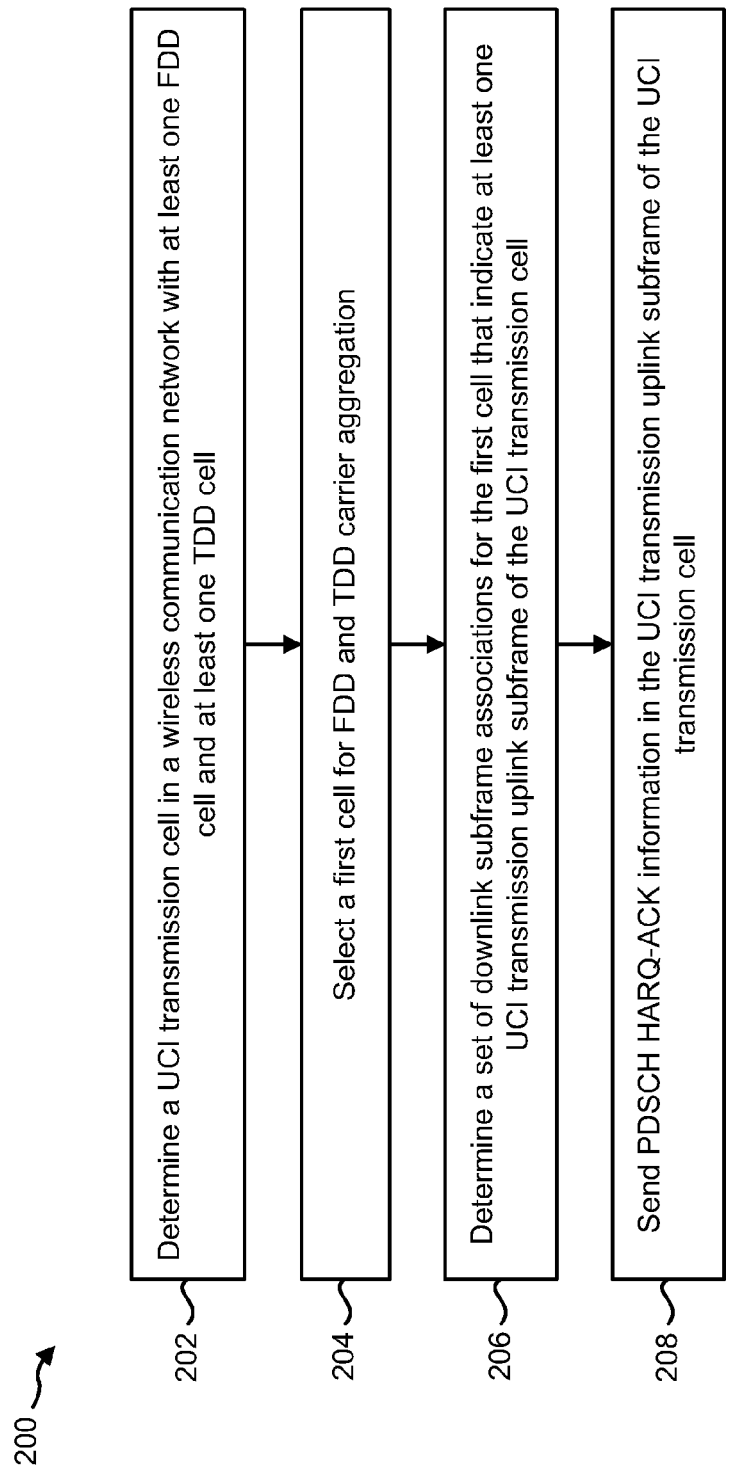
FIG. 2 is a flow diagram illustrating one implementation of a method for performing carrier aggregation by a UE.

FIG. 2 is a flow diagram illustrating one implementation of a method 200 for performing carrier aggregation by a UE 102. A UE 102 may determine 202 a UCI transmission cell in a wireless communication network with at least one FDD cell and at least one TDD cell. For example, the wireless communication network may be a hybrid duplexing network in which carrier aggregation may be performed with one or more FDD cells and one or more TDD cells. Additionally, in one implementation, the wireless communication network may be an LTE network. UCI may include one or more of PDSCH HARQ-ACK information and CSI. The UCI transmission cell may include a communication channel 119, 121 between the UE 102 and an eNB 160 for transmitting UCI. The UCI transmission cell may be either a FDD cell or a TDD cell. Therefore, the UE 102 may determine 202 a UCI transmission cell that is either a FDD or a TDD cell. In some implementations, the UE 102 may make this determination 202 based on an indicator received from an eNB 160 that indicates the UCI transmission cell.

In one implementation, the UE may determine 202 that the UCI transmission cell is a FDD cell. For example, the UCI transmission cell may be a PCell, which may be a macro cell that is configured with FDD. In this implementation, the UCI may be reported on one cell only (e.g., a PCell) for all of the cells (e.g., the FDD cells and TDD cells) in the hybrid duplexing network. The UCI may be reported on a PUCCH of the PCell. Alternatively, the UCI may be reported on the PUSCH of the allocated cell with the lowest Cell_ID.

In another implementation, the UE may determine 202 that the UCI transmission cell is a FDD reporting cell. For example, the PCell may be a TDD cell, but the UCI transmission cell may be determined 202 to be a reporting cell configured with FDD. Therefore, in this implementation, the UCI transmission cell may be a SCell that is configured with FDD.

In yet another implementation, the UE 102 may determine 202 a UCI transmission cell for FDD cells, and the UE 102 may also determine 202 a separate second UCI transmission cell for TDD cells. For example, the FDD cells and TDD cells may maintain independent UCI reports. In this implementation, the UE 102 may determine 202 that a FDD anchor cell may be the UCI transmission cell for the FDD cells. The FDD anchor cell may be a PCell, SCell or a secondary PCell. The UE 102 may also determine 202 that a TDD anchor cell may be the second UCI transmission cell for the TDD cells. The TDD anchor cell may be a PCell, SCell or a secondary PCell.

The UE 102 may select 204 a first cell for FDD and TDD carrier aggregation. For example, the UE 102 may select 204 a FDD cell or a TDD cell as a first cell for carrier aggregation. The first cell may be a PCell or a SCell. Additionally, the first cell may be the same cell as the UCI transmission cell, or the first cell may be a different cell than the UCI transmission cell. In some implementations, the UE 102 may make this selection 204 based on an indicator received from an eNB 160 that indicates the first cell for FDD and TDD carrier aggregation.

The UE 102 may determine 206 a set of downlink subframe associations for the first cell that indicate at least one UCI transmission uplink subframe of the UCI transmission cell. The set of downlink subframe associations may include timings (e.g., PDSCH HARQ-ACK associations) for at least one corresponding UCI transmission uplink subframe, as described below in connection with FIG. 5, FIG. 6 and FIG. 7. In some implementations, the UE 102 may make this determination 206 based on an indicator received from an eNB 160 that indicates the set of downlink subframe associations.

In one implementation, the UE 102 may determine 206 that the set of downlink associations for the first cell may include the PDSCH association timing of the UCI transmission cell. For example, if the UCI transmission cell is a FDD cell and the first cell is a TDD cell, the first cell may follow the association timing of a FDD cell. In other words, if the first cell is a TDD cell, the first cell may follow the association timing of a FDD cell in PDSCH HARQ-ACK reporting for CA in a hybrid duplexing network.

In another implementation, the UE 102 may determine 206 that the set of downlink subframe associations for first cell may include maintaining a PDSCH association timing of the first cell. For example, if the UCI transmission cell is a FDD cell and the first cell is a TDD cell, the first cell may maintain its own PDSCH association timing. For instance, the first cell may use a TDD UL-DL configuration as described below in connection with FIG. 5 and FIG. 6.

In this implementation, the PDSCH HARQ-ACK bits of the first cell may be multiplexed and reported on the PUCCH or PUSCH on the UCI transmission cell. Alternatively, the FDD cells and the TDD cells may maintain independent reporting mechanisms with their own PDSCH association timings.

The UE 102 may send 208 PDSCH HARQ-ACK information in the UCI transmission uplink subframe of the UCI transmission cell. For example, the UE 102 may send 208 PDSCH HARQ-ACK information in the UCI transmission uplink subframe corresponding to the determined 206 set of downlink subframe associations.

In one implementation, the UE 102 may send 208 PDSCH HARQ-ACK information on the PUCCH or PUSCH of one cell only. For example, if the UCI transmission cell is a FDD cell, the first cell is a TDD, and the set of downlink subframe associations for the first cell includes the PDSCH association timing of the UCI transmission cell, the UE 102 may send 208 PDSCH HARQ-ACK information for the TDD cell in an UL (e.g., PUCCH or PUSCH) of the FDD cell. Because a DL is available in all subframes on a FDD cell, the PDSCH HARQ-ACK on a TDD cell may always be reported on a corresponding UL of a FDD cell.

In another implementation where the UCI transmission cell is a FDD cell, the first cell is a TDD, but the set of downlink subframe associations for the first cell may include maintaining the PDSCH association timing of the first cell, the UE 102 may also send 208 PDSCH HARQ-ACK information on the PUCCH or PUSCH of one cell only. In this implementation, the PDSCH HARQ-ACK information for each cell may be generated based on its own association timings. For example, a TDD cell may follow a TDD DL-UL configuration as described in connection with FIG. 5, and a FDD cell may follow an association timing as described in connection with FIG. 7. Therefore, PDSCH HARQ-ACK information for the first cell may be generated according to the association timing of the first cell. Additionally, the PDSCH HARQ-ACK information for the first cell may be multiplexed and sent 208 by the UE 102 in the UCI transmission uplink subframe of the UCI transmission cell. In other words, the UE 102 may send 208 PDSCH HARQ-ACK information for the TDD cell in an UL (e.g., PUCCH or PUSCH) of the FDD cell.

In yet another implementation, where the FDD cells may have a UCI transmission cell and the TDD cells may have a second UCI transmission cell, the UE 102 may send 208 PDSCH HARQ-ACK information in a UCI transmission uplink subframe to one or more cells. For example, as described above, the FDD cells and TDD cells may maintain independent UCI reports. In this case, the FDD cells may include a UCI transmission cell (e.g., a FDD anchor cell) and the TDD cells may include a second UCI transmission cell (e.g., a TDD anchor cell). Multiple PUCCHs or PUSCHs may be reported concurrently on the FDD anchor cell and the TDD anchor cell. The UE 102 may concurrently send 208 PDSCH HARQ-ACK information for the FDD cells and TDD cells in a UCI transmission uplink subframe corresponding to the UCI transmission cell or the second UCI transmission cell. Alternatively, the PDSCH HARQ-ACK information for both the FDD cells and the TDD cells may be multiplexed and sent 208 in an UL (e.g., PUCCH or PUSCH) of one cell (e.g., a PCell).

Figure 3:
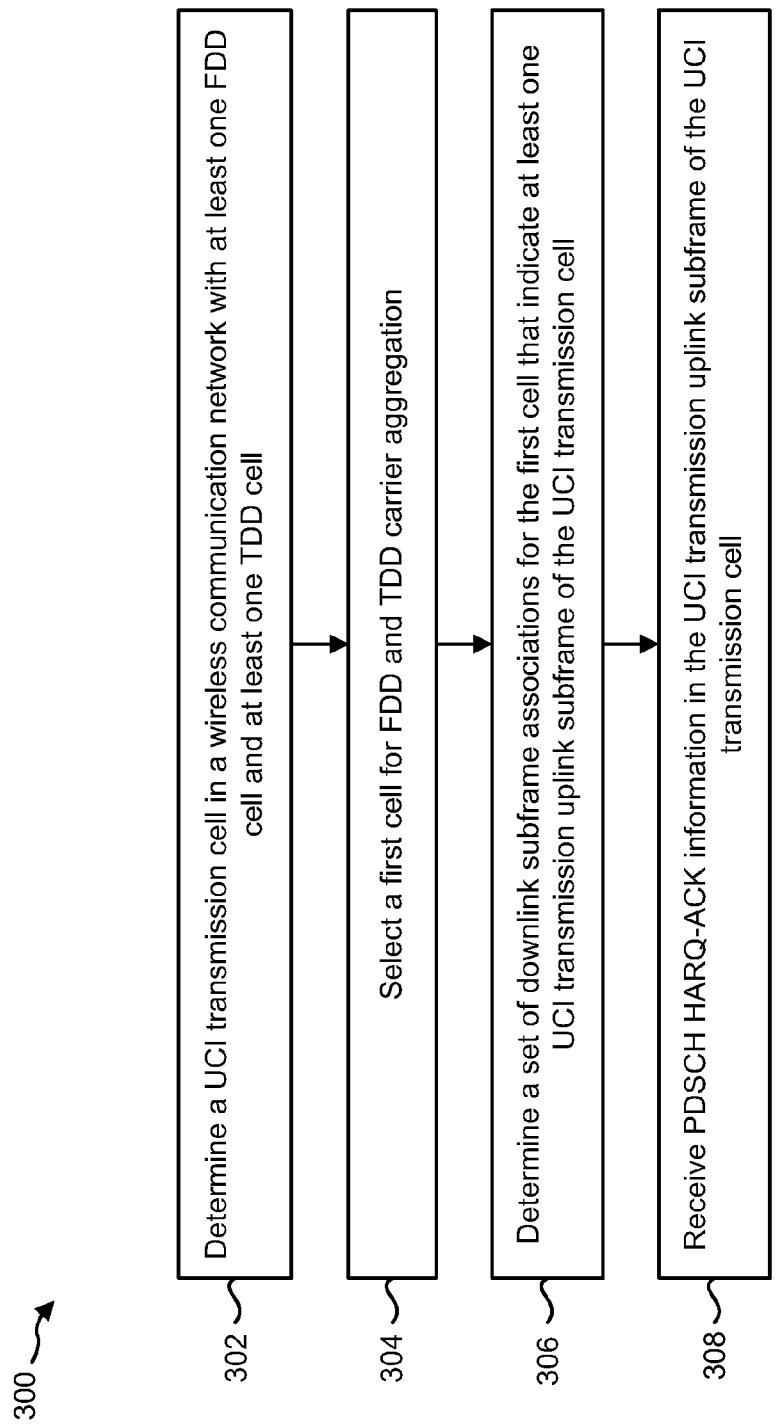
FIG. 3 is a flow diagram illustrating one implementation of a method for performing carrier aggregation by an eNB.

FIG. 3 is a flow diagram illustrating one implementation of a method 300 for performing carrier aggregation by an eNB 160. An eNB 160 may determine 302 a UCI transmission cell in a wireless communication network with at least one FDD cell and at least one TDD cell. For example, the wireless communication network may be a hybrid duplexing network in which carrier aggregation may be performed with one or more FDD cell and one or more TDD cell. Additionally, in one implementation, the wireless communication network may be an LTE network. UCI may include one or more of PDSCH HARQ-ACK information and CSI. The UCI transmission cell may include a communication channel 119, 121 between the eNB 160 and a UE 102 for transmitting UCI. The UCI transmission cell may be either a FDD cell or a TDD cell. Therefore, the eNB 160 may determine 302 a UCI transmission cell that is either a FDD or a TDD cell. In some implementations, the eNB 160 may generate and send an indicator based on this determination 302 that indicates the UCI transmission cell.

In one implementation, the UE may determine 302 that the UCI transmission cell is a FDD cell. For example, the UCI transmission cell may be a PCell, which may be a macro cell that is configured with FDD. In this implementation, the UCI may be reported on one cell only (e.g., a PCell) for all of the cells (e.g., the FDD cells and TDD cells) in the hybrid duplexing network. The UCI may be reported on a PUCCH of the PCell. Alternatively, the UCI may be reported on the PUSCH of the allocated cell with the lowest Cell_ID.

In another implementation, the UE may determine 302 that the UCI transmission cell is a FDD reporting cell. For example, the PCell may be a TDD cell, but the UCI transmission cell may be determined 302 to be a reporting cell configured with FDD. Therefore, in this implementation, the UCI transmission cell may be an SCell that is configured with FDD.

In yet another implementation, the eNB 160 may determine 302 a UCI transmission cell for FDD cells, and the eNB 160 may also determine 302 a separate second UCI transmission cell for TDD cells. For example, the FDD cells and TDD cells may maintain independent UCI reports. In this implementation, the eNB 160 may determine 302 that a FDD anchor cell may be the UCI transmission cell for the FDD cells. The FDD anchor cell may be a PCell, SCell or a secondary PCell. The eNB 160 may also determine 302 that a TDD anchor cell may be the second UCI transmission cell for the TDD cells. The TDD anchor cell may be a PCell, SCell or a secondary PCell.

The eNB 160 may select 304 a first cell for FDD and TDD carrier aggregation. For example, the eNB 160 may select 304 a FDD cell or a TDD cell as a first cell for carrier aggregation. The first cell may be a PCell or an SCell. In some implementations, the eNB 160 may generate and send an indicator based on this selection 304 that indicates the first cell for FDD and TDD carrier aggregation.

The eNB 160 may determine 306 a set of downlink subframe associations for the first cell that indicate at least one UCI transmission uplink subframe of the UCI transmission cell. The set of downlink subframe associations may include timings (e.g., association timings) for at least one corresponding UCI transmission uplink subframe, as described below in connection with FIG. 5, FIG. 6 and FIG. 7. In some implementations, the eNB 160 may generate and send an indicator based on this determination 306 that indicates the set of downlink subframe associations.

In one implementation, the eNB 160 may determine 306 that the set of downlink associations for the first cell may include the PDSCH association timing of a UCI transmission cell. For example, if the UCI transmission cell is a FDD cell and the first cell is a TDD cell, the first cell may follow the association timing of a FDD cell. In other words, if the first cell is a TDD cell, the first cell may follow the association timing of a FDD cell in PDSCH HARQ-ACK reporting for CA in a hybrid duplexing network.

In another implementation, the eNB 160 may determine 306 that the set of downlink subframe associations for first cell may include maintaining a PDSCH association timing of the first cell. For example, if the UCI transmission cell is a FDD cell and the first cell is a TDD cell, the first cell may maintain its own PDSCH association timing. For instance, the first cell may use a TDD UL-DL configuration as described below in connection with FIG. 5 and FIG. 6.

In this implementation, the PDSCH HARQ-ACK bits of the first cell may be multiplexed and reported on the PUCCH or PUSCH on the UCI transmission cell. Alternatively, the FDD cells and the TDD cells may maintain independent reporting mechanisms with their own PDSCH association timings.

The eNB 160 may receive 308 PDSCH HARQ-ACK information in the UCI transmission uplink subframe of the UCI transmission cell. For example, the eNB 160 may receive 308 PDSCH HARQ-ACK information in the UCI transmission uplink subframe corresponding to the determined 306 set of downlink subframe associations.

In one implementation, the eNB 160 may receive 308 PDSCH HARQ-ACK information on the PUCCH or PUSCH of one cell only. For example, if the UCI transmission cell is a FDD cell, the first cell is a TDD, and the set of downlink subframe associations for the first cell includes the PDSCH association timing of the UCI transmission cell, the eNB 160 may receive 308 PDSCH HARQ-ACK information for the TDD cell in an UL (e.g., PUCCH or PUSCH) of the FDD cell. Because a DL is available in all subframes on a FDD cell, the PDSCH HARQ-ACK on a TDD cell may always be reported on a corresponding UL of a FDD cell.

In another implementation where the UCI transmission cell is a FDD cell, the first cell is a TDD, but the set of downlink subframe associations for the first cell may include maintaining the PDSCH association timing of the first cell, the eNB 160 may also receive 308 PDSCH HARQ-ACK information on the PUCCH or PUSCH of one cell only. In this implementation, the PDSCH HARQ-ACK information for each cell may be generated based on its own association timings. For example, a TDD cell may follow a TDD DL-UL configuration as described in connection with FIG. 5, and a FDD cell may follow an association timing as described in connection with FIG. 7. Therefore, PDSCH HARQ-ACK information for the first cell may be generated according to the association timing of the first cell. Additionally, the PDSCH HARQ-ACK information for the first cell may be multiplexed and received 308 by the eNB 160 in the UCI transmission uplink subframe of the UCI transmission cell. In other words, the eNB 160 may receive 308 PDSCH HARQ-ACK information for the TDD cell in an UL (e.g., PUCCH or PUSCH) of the FDD cell.

In yet another implementation, where the FDD cells may have a UCI transmission cell and the TDD cells may have a second UCI transmission cell, the eNB 160 may receive 308 PDSCH HARQ-ACK information in a UCI transmission uplink subframe to one or more cells. For example, as described above, the FDD cells and TDD cells may maintain independent UCI reports. In this case, the FDD cells may include a UCI transmission cell (e.g., a FDD anchor cell) and the TDD cells may include a second UCI transmission cell (e.g., a TDD anchor cell). Multiple PUCCHs or PUSCHs may be reported concurrently on the FDD anchor cell and the TDD anchor cell. The eNB 160 may concurrently receive 308 PDSCH HARQ-ACK information for the FDD cells and TDD cells in a UCI transmission uplink subframe corresponding to the UCI transmission cell or the second UCI transmission cell. Alternatively, the PDSCH HARQ-ACK information for both the FDD cells and the TDD cells may be multiplexed and received 308 in an UL (e.g., PUCCH or PUSCH) of one cell (e.g., a PCell).

Figure 4:
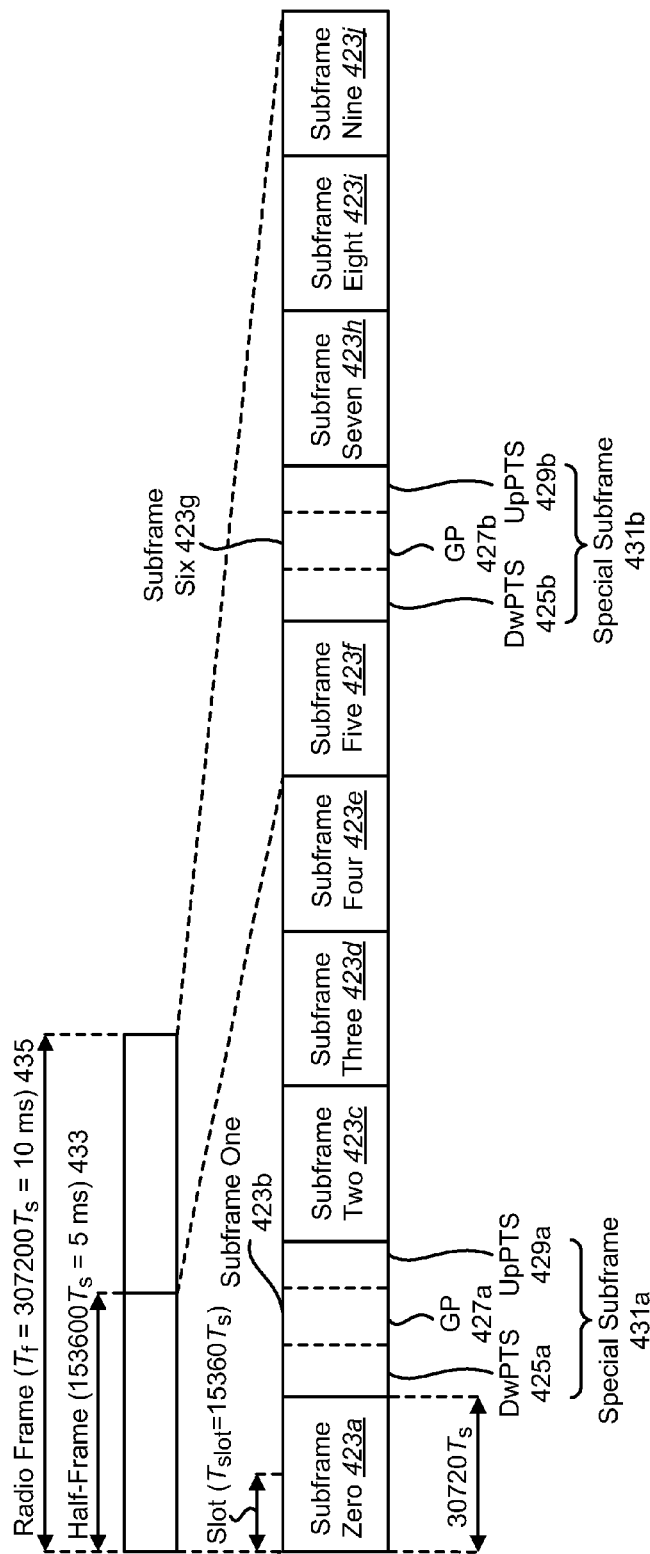
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure illustrates a TDD structure. Each radio frame 435 may have a length of $T_f = 307200 \cdot T_s = 10$ ms, where $T_f$ is a radio frame 435 duration and $T_s$ is a time unit equal to $$\frac{1}{(15000 \times 2048)}$$

seconds. The radio frame 435 may include two half-frames 433, each having a length of $153600 \cdot T_s = 5$ ms. Each half-frame 433 may include five subframes 423a-e, 423f-j each having a length of $30720 \cdot T_s = 1$ ms.

TDD UL-DL configurations 0-6 are given below in Table (1) (from Table 4.2-2 in 3GPP TS 36.211). UL-DL configurations with both 5 millisecond (ms) and 10 ms downlink-to-uplink switch-point periodicity may be supported. In particular, seven UL-DL configurations are specified in 3GPP specifications, as shown in Table (1) below. In Table (1), "D" denotes a downlink subframe, "S" denotes a special subframe and "U" denotes an UL subframe.

TABLE (1)

| TDD UL-DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (1) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (2) (from Table 4.2-1 of 3GPP TS 36.211) subject to the total length of DwPTS, GP and UpPTS being equal to $30720 \cdot T_s = 1$ ms. In Table (2), "cyclic prefix" is abbreviated as "CP" and "configuration" is abbreviated as "Config" for convenience.

TABLE (2)

| Special Subframe Config | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL-DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 423 that may be used include a downlink subframe, an uplink subframe and a special subframe 431. In the example illustrated in FIG. 4, which has a 5 ms periodicity, two standard special subframes 431a-b are included in the radio frame 435.

The first special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (5) above) subject to the total length of each set of DwPTS 425, GP 427 and UpPTS 429 being equal to $30720 \cdot T_s = 1$ ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot} = 15360 \cdot T_s = 0.5$ ms in each subframe 423. For example, subframe zero (e.g., 0) 423a may include two slots, including a first slot.

UL-DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 433 includes a standard special subframe 431a-b. In the case of 10 ms downlink-to-uplink switch-point periodicity, a special subframe may exist in the first half-frame 433 only.

Subframe zero (e.g., 0) 423a and subframe five (e.g., 5) 423f and DwPTS 425a-b may be reserved for downlink transmission. The UpPTS 429a-b and the subframe(s) immediately following the special subframe(s) 431a-b (e.g., subframe two 423c and subframe seven 423h) may be reserved for uplink transmission. It should be noted that, in some implementations, special subframes 431 may be considered DL subframes in order to determine a set of DL subframe associations that indicate UCI transmission uplink subframes of a UCI transmission cell.

Figure 5:
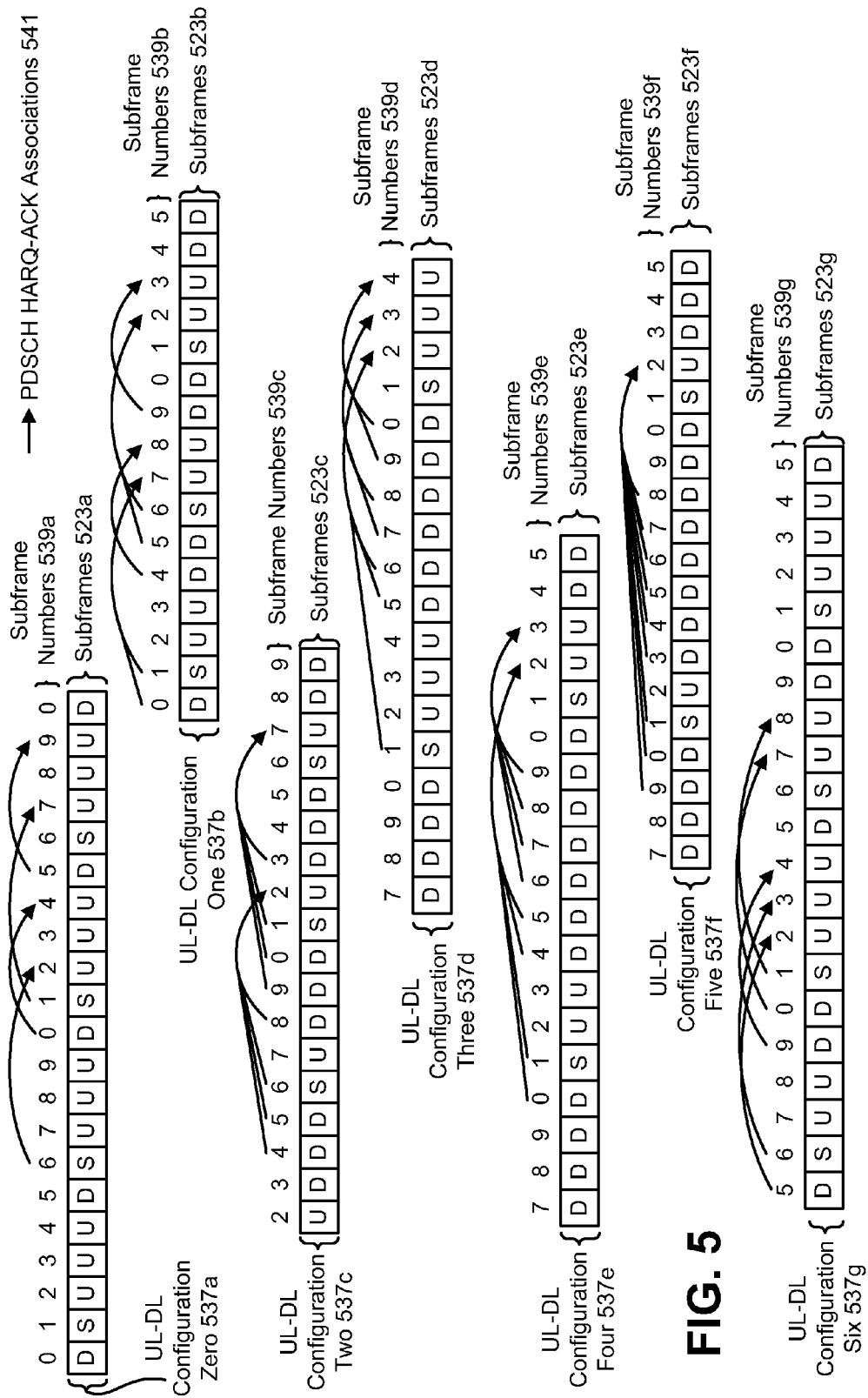
FIG. 5 is a diagram illustrating some Time-Division Duplexing (TDD) uplink-downlink (UL-DL) configurations in accordance with the systems and methods described herein.

FIG. 5 is a diagram illustrating some TDD UL-DL configurations 537a-g in accordance with the systems and methods described herein. In particular, FIG. 5 illustrates UL-DL configuration zero 537a (e.g., "UL-DL configuration 0") with subframes 523a and subframe numbers 539a, UL-DL configuration one 537b (e.g., "UL-DL configuration 1") with subframes 523b and subframe numbers 539b, UL-DL configuration two 537c (e.g., "UL-DL configuration 2") with subframes 523c and subframe numbers 539c and UL-DL configuration three 537d (e.g., "UL-DL configuration 3") with subframes 523d and subframe numbers 539d. FIG. 5 also illustrates UL-DL configuration four 537e (e.g., "UL-DL configuration 4") with subframes 523e and subframe numbers 539e, UL-DL configuration five 537f (e.g., "UL-DL configuration 5") with subframes 523f and subframe numbers 539f and UL-DL configuration six 537g (e.g., "UL-DL configuration 6") with subframes 523g and subframe numbers 539g.

FIG. 5 further illustrates PDSCH HARQ-ACK associations 541 (e.g., PDSCH HARQ-ACK feedback on PUCCH or PUSCH associations). The PDSCH HARQ-ACK associations 541 may indicate HARQ-ACK reporting subframes corresponding to subframes for PDSCH transmissions (e.g., subframes in which PDSCH transmissions may be sent and/or received). It should be noted that some of the radio frames illustrated in FIG. 5 have been truncated for convenience.

The systems and methods disclosed herein may be applied to one or more of the UL-DL configurations 537a-g illustrated in FIG. 5. For example, one or more PDSCH HARQ-ACK associations 541 corresponding to one of the UL-DL configurations 537a-g illustrated in FIG. 5 may be applied to communications between a UE 102 and eNB 160. For example, an UL-DL configuration 537 may be determined (e.g., assigned to, applied to) a PCell. In this case, PDSCH HARQ-ACK associations 541 may specify PDSCH HARQ-ACK timing (e.g., a HARQ-ACK reporting subframe) for HARQ-ACK feedback transmissions corresponding to the PCell. For SCell HARQ-ACK feedback transmissions, the PDSCH HARQ-ACK associations 541 corresponding to a reference UL-DL configuration in accordance with the feedback parameters may be utilized.

A PDSCH HARQ-ACK association 541 may specify a particular (PDSCH HARQ-ACK) timing for receiving HARQ-ACK information corresponding to a PDSCH. A PDSCH HARQ-ACK association 541 may specify a reporting subframe in which the UE 102 reports (e.g., transmits) the HARQ-ACK information corresponding to the PDSCH to the eNB 160. The reporting subframe may be determined based on the subframe that includes the PDSCH sent by the eNB 160.

Figure 6:
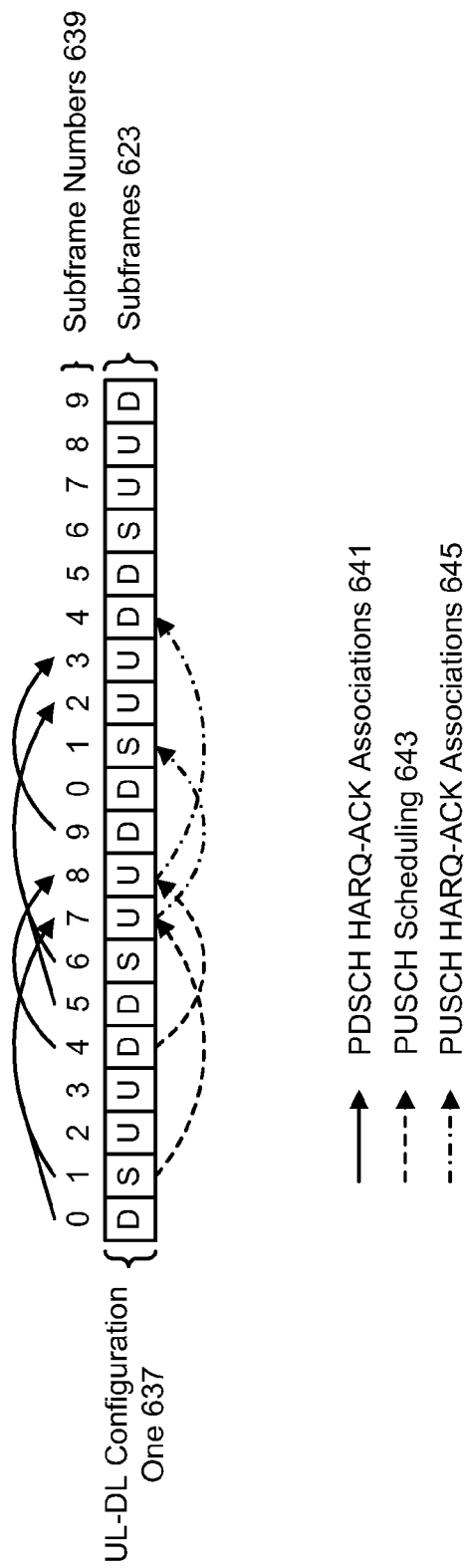
FIG. 6 illustrates a specific implementation of association timings of a TDD cell with UL-DL configuration one.

FIG. 6 illustrates a specific implementation of association timings of a TDD cell with UL-DL configuration one 637. FIG. 6 illustrates UL-DL configuration one 637 (e.g., "UL-DL configuration 1") with subframes 623 and subframe numbers 639. The PDSCH HARQ-ACK associations 641, PUSCH scheduling 643 and PUSCH HARQ-ACK associations 645 are illustrated. The PDSCH HARQ-ACK associations 641 may indicate HARQ-ACK reporting subframes corresponding to subframes for PDSCH transmissions (e.g., subframes in which PDSCH transmissions may be sent and/or received). In one implementation, the PDSCH HARQ-ACK reporting may occur on a PUCCH or a PUSCH. The PUSCH HARQ-ACK associations 645 may indicate HARQ-ACK reporting subframes corresponding to subframes for PUSCH transmissions (e.g., subframes in which PUSCH transmissions may be sent and/or received). In another implementation, the PUSCH HARQ-ACK reporting may occur on a PHICH or a PDCCH. In yet another implementation, the PUSCH scheduling 643 may include scheduling by an UL grant or PHICH (or ePHICH) feedback from another cell.

As described above in connection with FIG. 5, there are seven different TDD UL-DL configurations 537a-g, all with different association timings. Furthermore, with inter-band TDD CA with different TDD UL-DL configurations, the association timing of one TDD cell may follow the timing of a reference TDD UL-DL configuration. Moreover, in TDD CA with different UL-DL configurations, the PDSCH HARQ-ACK timing may follow one reference TDD UL-DL configuration, and the PUSCH scheduling and HARQ-ACK timing may follow another reference TDD UL-DL configuration. The reference configurations may be the same or different.

Figure 7:
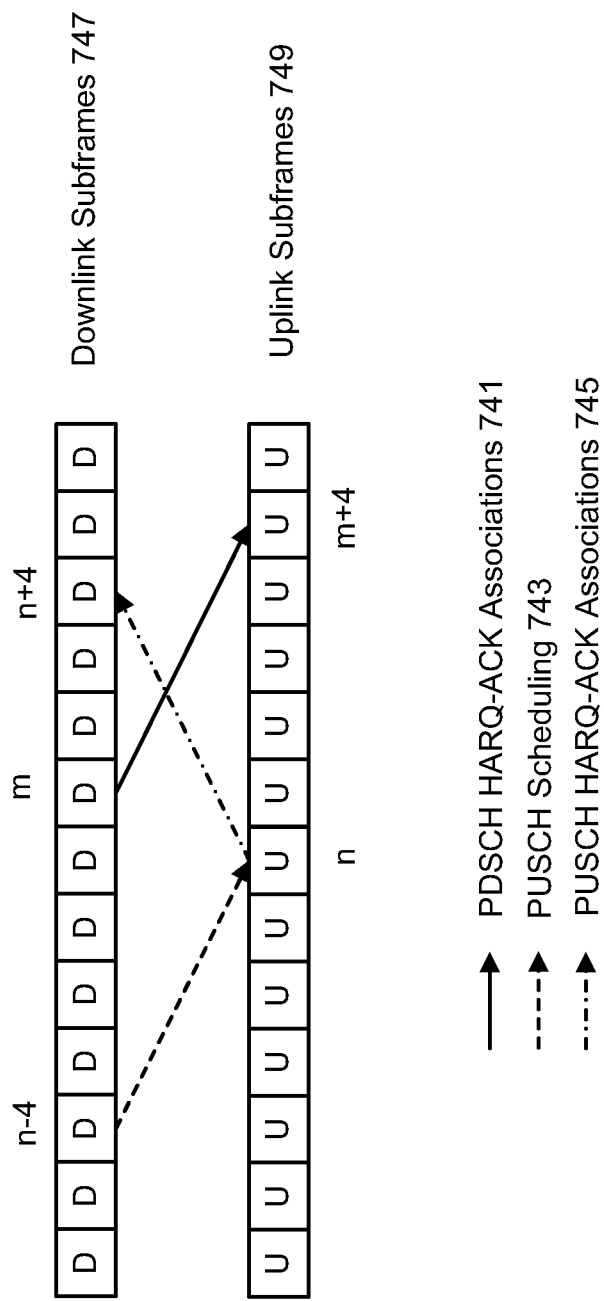
FIG. 7 illustrates the association timings of a Frequency Division Duplexing (FDD) cell.

FIG. 7 illustrates the association timings of a FDD cell. The FDD cell may include paired downlink subframes 747 and uplink subframes 749. The PDSCH HARQ-ACK associations 741, PUSCH scheduling 743 and PUSCH HARQ-ACK associations 745 are illustrated. The PDSCH HARQ-ACK associations 741 may indicate HARQ-ACK reporting subframes corresponding to subframes for PDSCH transmissions (e.g., subframes in which PDSCH transmissions may be sent and/or received). In some implementations, the PDSCH HARQ-ACK reporting may occur on a PUCCH or a PUSCH. The PUSCH HARQ-ACK associations 745 may indicate HARQ-ACK reporting subframes corresponding to subframes for PUSCH transmissions (e.g., subframes in which PUSCH transmissions may be sent and/or received). In some implementations, the PUSCH HARQ-ACK reporting may occur on a PHICH or a PDCCH. In some implementations, the PUSCH scheduling 743 may include scheduling by an UL grant or PHICH (or ePHICH) feedback from another cell.

A fixed 4 ms interval may be applied to the PDSCH HARQ-ACK associations 741, PUSCH scheduling 743 and PUSCH HARQ-ACK associations 745. For example, each of the downlink subframes 747 and uplink subframes 749 may be 1 ms. Therefore, the PDSCH HARQ-ACK transmission in subframe m+4 may be associated with a PDSCH transmission in subframe m. A PUSCH transmission in subframe n may be associated with the PUSCH scheduling 743 in subframe n−4. Furthermore, the PUSCH HARQ-ACK transmission in subframe n+4 may be associated with the PUSCH transmission in subframe n. For an FDD cell, for example, a fixed 4 ms may be applied to both PDSCH and PUSCH timings.

Figure 8:
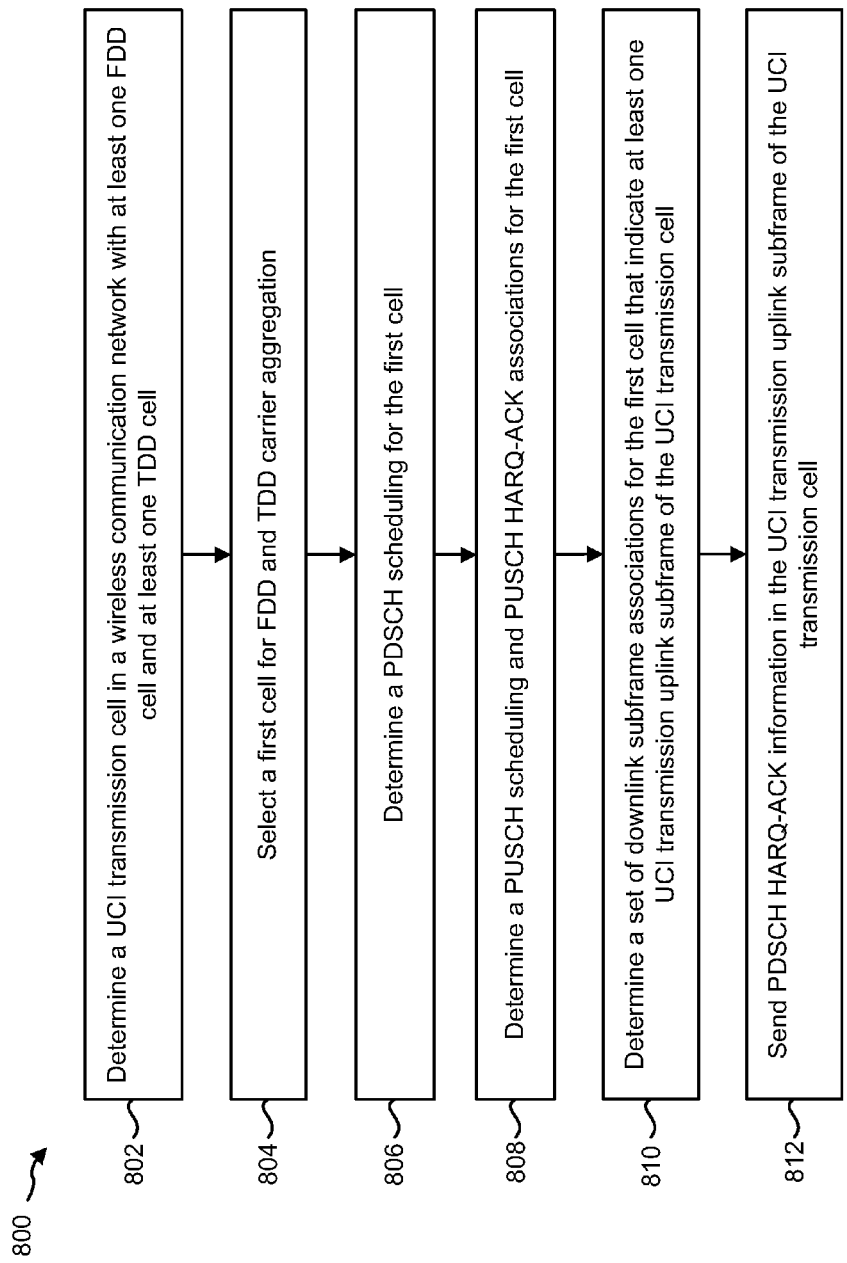
FIG. 8 is a flow diagram illustrating a more specific implementation of a method for performing carrier aggregation by a UE.

FIG. 8 is a flow diagram illustrating a more specific implementation of a method 800 for performing carrier aggregation by a UE 102. This may be accomplished as described above in connection with FIG. 2, for example. A UE 102 may determine 802 a UCI transmission cell in a wireless communication network with at least one FDD cell and at least one TDD cell. For example, the wireless communication network may be a hybrid duplexing network in which carrier aggregation may be performed with one or more FDD cell and one or more TDD cell. The UCI transmission cell may be either a FDD cell or a TDD cell.

In one implementation, the UE 102 may determine 802 a UCI transmission cell is a FDD cell or a TDD cell. This may be accomplished as described above in connection with FIG. 2. For example, the UCI transmission cell may be a PCell, which may be a macro cell that is configured with FDD. In this implementation, the UCI may be reported on one cell only (e.g., a PCell) for all of the cells (e.g., the FDD cells and TDD cells) in the hybrid duplexing network. For instance, the UCI may be reported on a PUCCH of the PCell.

The UE 102 may select 804 a first cell for FDD and TDD carrier aggregation. This may be accomplished as described above in connection with FIG. 2, for instance. For example, the UE 102 may select 804 a TDD cell as a first cell for carrier aggregation.

The UE 102 may determine 806 a PDSCH scheduling for the first cell. For example, with PDSCH self-scheduling, the PDSCH transmission for the first cell may be indicated by a corresponding PDCCH (or ePDCCH) on the first cell in the same subframe (e.g., the same transmission time interval (TTI)), or for a PDCCH (or ePDCCH) on the first cell in the same subframe indicating a downlink semi-persistent scheduling (SPS) release.

With cross-carrier scheduling, the PDSCH transmission on the first cell may be scheduled by the PDCCH (or ePDCCH) on another cell. For example, if the scheduling cell is a FDD cell (e.g., a PCell) and the first cell is a TDD cell, the PDSCH scheduling may follow the scheduling cell timing. On the other hand, if the scheduling cell is a TDD cell and the first cell is a FDD cell, a PDSCH transmission may be cross-carrier scheduled, for example, in the subframes where DL is allocated on the scheduling TDD cell.

The UE 102 may determine 808 a PUSCH scheduling 643, 743 and PUSCH HARQ-ACK associations 645, 745 for the first cell. For example, for PUSCH self-scheduling, the eNB 160 may schedule a PDCCH (or ePDCCH) with a downlink control information (DCI) format 0/4 and/or a PHICH (or ePHICH) transmission on the first cell in a DL subframe intended for the UE 102. The UE 102 may adjust the corresponding PUSCH transmission in subframe n+k based on the PDCCH (or ePDCCH) and PHICH (or ePHICH) information, where k may be 4 for FDD, and k may be decided by (e.g., based on) the TDD UL-DL configurations of the TDD cells according to Table 8.3-1 in 3GPP TS36.213. The PUSCH HARQ-ACK report may be associated with the PUSCH transmission by a PHICH (or ePHICH) or PDCCH (or ePDCCH) on the first cell following the corresponding PUSCH HARQ-ACK associations 645, 745.

With cross-carrier scheduling, the PUSCH scheduling 643, 743 and PUSCH HARQ-ACK associations 645, 745 for the first cell may be determined 808 based on a scheduling cell timing. For example, the PUSCH transmission on a cell may be scheduled by an UL grant or PHICH (or ePHICH) feedback from another cell (e.g., a scheduling cell). With hybrid duplexing networks, if the scheduling cell is a FDD cell and scheduled cell is a TDD cell, the PUSCH transmission may be cross-carrier scheduled.

In one implementation, because UL may be allocated in all subframes of the scheduling FDD cell, the scheduled TDD cell may always be cross-carrier scheduled with the FDD cell PUSCH scheduling 743 and PUSCH HARQ-ACK associations 745. For example, a fixed 4 ms PUSCH scheduling 743 and the PUSCH HARQ-ACK associations 745 of a FDD cell (as illustrated in connection with FIG. 7) may be used to cross-carrier schedule a TDD cell.

On the other hand, if the scheduling cell is a TDD cell and the first cell (e.g., the scheduled cell) is a FDD cell, the first cell may follow the scheduling cell timing on PUSCH scheduling 643 and PUSCH HARQ-ACK associations 645. But the subframes with DL allocation in the TDD scheduling cell may not be able to schedule PUSCH transmission on the scheduled FDD cell. For example, if the first cell is a FDD cell, the first cell may have a fixed turnaround time of 8 ms for PUSCH scheduling 743 and PUSCH HARQ-ACK associations 745. However, the TDD UL-DL configurations 537a-g have at least 10 ms turnaround time. Therefore, the FDD cell timing (e.g., PUSCH scheduling 743 and PUSCH HARQ-ACK associations 745) may not be applied for PUSCH scheduling and PUSCH HARQ-ACK associations for cross-carrier scheduling when the scheduling cell is a TDD cell and the scheduled cell (e.g., the first cell) is a FDD cell.

Additionally, the first cell may be a reference cell for cross-carrier PUSCH scheduling 643, 743 and PUSCH HARQ-ACK associations 645, 745. For example, if the PCell is a TDD cell, and the first cell is a FDD cell, the first cell may be configured as a reference cell for cross-carrier PUSCH scheduling 743 and PUSCH HARQ-ACK associations 745.

The UE 102 may determine 810 a set of downlink subframe associations for the first cell that indicate at least one UCI transmission uplink subframe of the UCI transmission cell.

This may be accomplished as described above in connection with FIG. 2, for example. The set of downlink subframe associations may include timings (e.g., PDSCH HARQ-ACK associations 641, 741) for at least one corresponding UCI transmission uplink subframe. This may be accomplished as described above in connection with FIG. 2. For example, the UE 102 may determine 810 that the set of downlink associations for the first cell may include the PDSCH HARQ-ACK associations 641, 741 of a UCI transmission cell. If the UCI transmission cell is a FDD cell and the first cell is a TDD cell, the first cell may follow the PDSCH HARQ-ACK associations 741 of the UCI transmission cell configured with FDD.

The UE 102 may send 812 PDSCH HARQ-ACK information in the UCI transmission uplink subframe of the UCI transmission cell. This may be accomplished as described above in connection with FIG. 2, for instance. For example, if the UCI transmission cell is a FDD cell, the first cell is a TDD, and the set of downlink subframe associations for the first cell includes the PDSCH association timing of the UCI transmission cell, the UE 102 may send 812 PDSCH HARQ-ACK information for the TDD cell in an UL (e.g., PUCCH or PUSCH) of the FDD cell.

Figure 9:
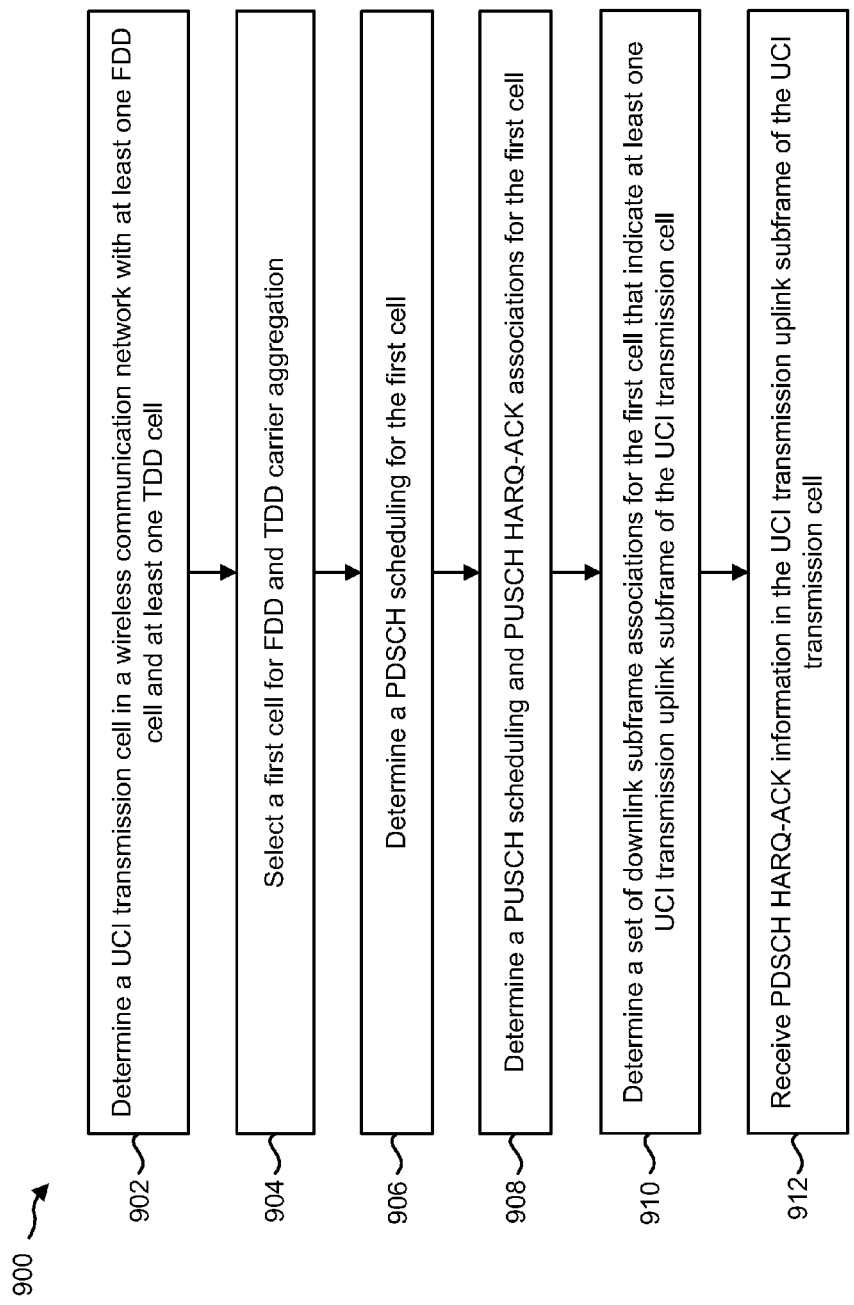
FIG. 9 is a flow diagram illustrating a more specific implementation of a method for performing carrier aggregation by an eNB.

FIG. 9 is a flow diagram illustrating a more specific implementation of a method 900 for performing carrier aggregation by an eNB 160. An eNB 160 may determine 902 a UCI transmission cell in a wireless communication network with at least one FDD cell and at least one TDD cell. This may be accomplished as described above in connection with FIG. 3, for instance. For example, the wireless communication network may be a hybrid duplexing network in which carrier aggregation may be performed with one or more FDD cell and one or more TDD cell. The UCI transmission cell may be either a FDD cell or a TDD cell.

In one implementation, the eNB 160 may determine 902 a UCI transmission cell is a FDD cell or a TDD cell. This may be accomplished as described above in connection with FIG. 2. For example, the UCI transmission cell may be a PCell, which may be a macro cell that is configured with FDD. In this implementation, the UCI may be reported on one cell only (e.g., a PCell) for all of the cells (e.g., the FDD cells and TDD cells) in the hybrid duplexing network. For instance, the UCI may be reported on a PUCCH of the PCell.

The eNB 160 may select 904 a first cell for FDD and TDD carrier aggregation. This may be accomplished as described above in connection with FIG. 3, for instance. For example, the eNB 160 may select 904 a TDD cell as a first cell for carrier aggregation.

The eNB 160 may determine 906 a PDSCH scheduling for the first cell. For example, with PDSCH self-scheduling, the PDSCH transmission for the first cell may be indicated by a corresponding PDCCH (or ePDCCH) on the first cell in the same subframe (e.g., the same transmission time interval (TTI)), or for a PDCCH (or ePDCCH) on the first cell in the same subframe indicating a downlink semi-persistent scheduling (SPS) release.

With cross-carrier scheduling, the PDSCH transmission on the first cell may be scheduled by the PDCCH (or ePDCCH) on another cell. For example, if the scheduling cell is a FDD cell (e.g., a PCell) and the scheduled cell is a TDD cell, the PDSCH scheduling may follow the scheduling cell timing. On the other hand, if the scheduling cell is a TDD cell and the scheduled cell is a FDD cell, a PDSCH transmission may be cross-carrier scheduled, for example, in the subframes where DL is allocated on the scheduling TDD cell.

The eNB 160 may determine 908 a PUSCH scheduling 643, 743 and PUSCH HARQ-ACK associations 645, 745 for the first cell. For example, for PUSCH self-scheduling, the eNB 160 may schedule a PDCCH (or ePDCCH) with a downlink control information (DCI) format 0/4 and/or a PHICH (or ePHICH) transmission on the first cell in a DL subframe intended for the UE 102. The UE 102 may adjust the corresponding PUSCH transmission in subframe n+k based on the PDCCH (or ePDCCH) and PHICH (or ePHICH) information, where k may be 4 for FDD and k may be decided by the TDD UL-DL configurations of the TDD cells according to Table 8.3-1 in 3GPP TS36.213. The PUSCH HARQ-ACK report may be associated with the PUSCH transmission by a PHICH (or ePHICH) or PDCCH (or ePDCCH) on the first cell following the corresponding PUSCH HARQ-ACK associations 645, 745.

With cross-carrier scheduling, the PUSCH scheduling 643, 743 and PUSCH HARQ-ACK associations 645, 745 for the first cell may be determined 908 based on a scheduling cell timing. For example, the PUSCH transmission on a cell may be scheduled by an UL grant or PHICH (or ePHICH) feedback from another cell (e.g., a scheduling cell). With hybrid duplexing networks, if the scheduling cell is a FDD cell and scheduled cell is a TDD cell, the PUSCH transmission may be cross-carrier scheduled.

In one implementation, because UL may be allocated in all subframes of the scheduling FDD cell, the scheduled TDD cell may always be cross-carrier scheduled with the FDD cell PUSCH scheduling 743 and PUSCH HARQ-ACK associations 745. For example, a fixed 4 ms PUSCH scheduling 743 and the PUSCH HARQ-ACK associations 745 of a FDD cell (as illustrated in connection with FIG. 7) may be used to cross-carrier schedule a TDD cell.

On the other hand, if the scheduling cell is a TDD cell and the first cell (e.g., the scheduled cell) is a FDD cell, the first cell may follow the scheduling cell timing on PUSCH scheduling 643 and PUSCH HARQ-ACK associations 645. But the subframes with DL allocation in the TDD scheduling cell may not be able to schedule PUSCH transmission on the scheduled FDD cell. For example, if the first cell is a FDD cell, the first cell may have a fixed turnaround time of 8 ms for PUSCH scheduling 743 and PUSCH HARQ-ACK associations 745. However, the TDD UL-DL configurations 537*a-g* have at least 10 ms turnaround time. Therefore, the FDD cell timing (e.g., PUSCH scheduling 743 and PUSCH HARQ-ACK associations 745) may not be applied for PUSCH scheduling and PUSCH HARQ-ACK associations for cross-carrier scheduling when the scheduling cell is a TDD cell and the scheduled cell (e.g., the first cell) is a FDD cell.

Additionally, the first cell may be a reference cell for cross-carrier PUSCH scheduling 643, 743 and PUSCH HARQ-ACK associations 645, 745. For example, if the PCell is a TDD cell, and the first cell is a FDD cell, the first cell may be configured as a reference cell for cross-carrier PUSCH scheduling 743 and PUSCH HARQ-ACK associations 745.

The eNB 160 may determine 910 a set of downlink subframe associations for the first cell that indicate at least one UCI transmission uplink subframe of the UCI transmission cell. The set of downlink subframe associations may include timings (e.g., PDSCH HARQ-ACK associations 641, 741) for at least one corresponding UCI transmission uplink subframe. This may be accomplished as described above in connection with FIG. 3, for instance. For example, the eNB 160 may determine 910 that the set of downlink associations for the first cell may include the PDSCH HARQ-ACK associations 641, 741 of a UCI transmission cell. If the UCI transmission cell is a FDD cell and the first cell is a TDD cell, the first cell may follow the PDSCH HARQ-ACK associations 741 of the UCI transmission cell configured with FDD.

The eNB 160 may receive 912 PDSCH HARQ-ACK information in the UCI transmission uplink subframe of the UCI transmission cell. This may be accomplished as described above in connection with FIG. 3, for instance. For example, if the UCI transmission cell is a FDD cell, the first cell is a TDD, and the set of downlink subframe associations for the first cell includes the PDSCH association timing of the UCI transmission cell, the eNB 160 may receive 912 PDSCH HARQ-ACK information for the TDD cell in an UL (e.g., PUCCH or PUSCH) of the FDD cell.

Figure 10:
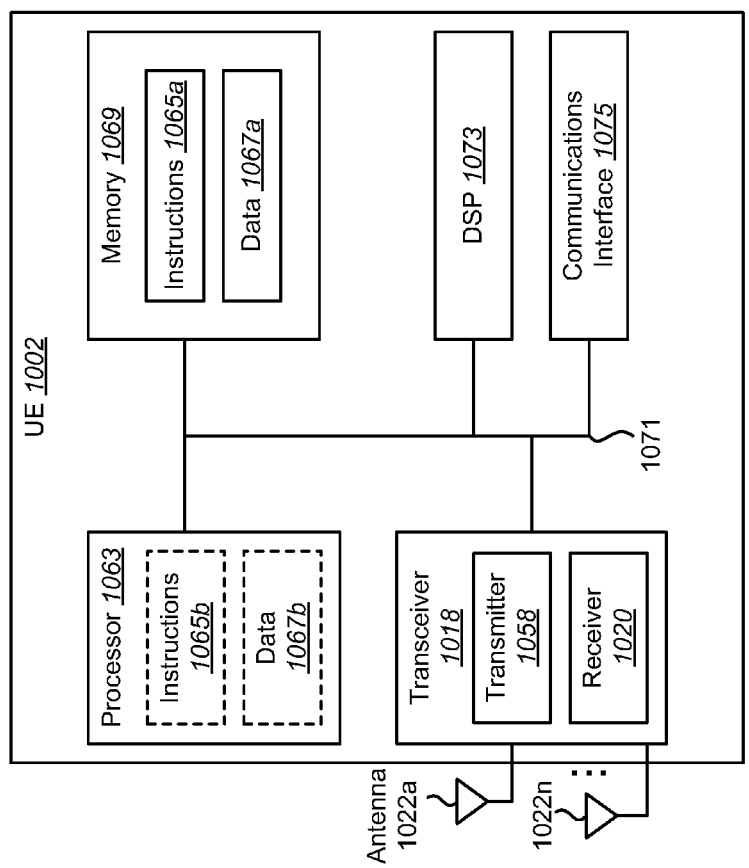
FIG. 10 illustrates various components that may be utilized in a UE.

FIG. 10 illustrates various components that may be utilized in a UE 1002. The UE 1002 described in connection with FIG. 10 may be implemented in accordance with the UE 102 described in connection with FIG. 1. The UE 1002 includes a processor 1063 that controls operation of the UE 1002. The processor 1063 may also be referred to as a central processing unit (CPU). Memory 1069, which may include read-only memory (ROM), random access memory (RAM), a combination of the two or any type of device that may store information, provides instructions 1065a and data 1067a to the processor 1063. A portion of the memory 1069 may also include non-volatile random access memory (NVRAM). Instructions 1065b and data 1067b may also reside in the processor 1063. Instructions 1065b and/or data 1067b loaded into the processor 1063 may also include instructions 1065a and/or data 1067a from memory 1069 that were loaded for execution or processing by the processor 1063. The instructions 1065b may be executed by the processor 1063 to implement one or more of the methods 200 and 800 described above.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022a-n are attached to the housing and electrically coupled to the transceiver 1018.

The various components of the UE 1002 are coupled together by a bus system 1071, which may include a power bus, a control signal bus and a status signal bus, in addition to a data bus. However, for the sake of clarity, the various buses are illustrated in FIG. 10 as the bus system 1071. The UE 1002 may also include a digital signal processor (DSP) 1073 for use in processing signals. The UE 1002 may also include a communications interface 1075 that provides user access to the functions of the UE 1002. The UE 1002 illustrated in FIG. 10 is a functional block diagram rather than a listing of specific components.

Figure 11:
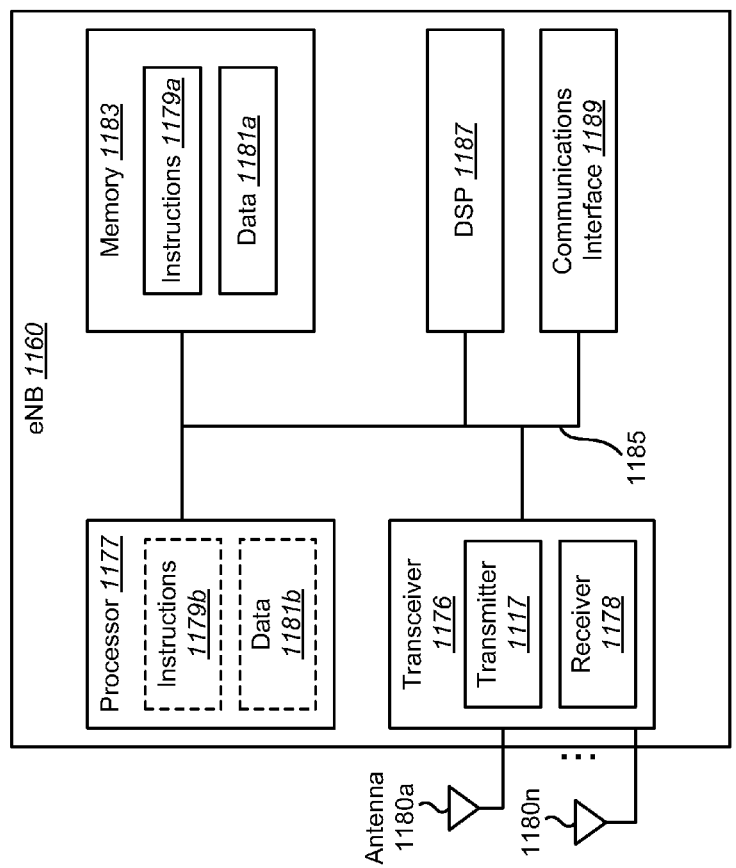
FIG. 11 illustrates various components that may be utilized in an eNB.

FIG. 11 illustrates various components that may be utilized in an eNB 1160. The eNB 1160 described in connection with FIG. 11 may be implemented in accordance with the eNB 160 described in connection with FIG. 1. The eNB 1160 includes a processor 1177 that controls operation of the eNB 1160. The processor 1177 may also be referred to as a central processing unit (CPU). Memory 1183, which may include read-only memory (ROM), random access memory (RAM), a combination of the two or any type of device that may store information, provides instructions 1179a and data 1181a to the processor 1177. A portion of the memory 1183 may also include non-volatile random access memory (NVRAM). Instructions 1179b and data 1181b may also reside in the processor 1177. Instructions 1179b and/or data 1181b loaded into the processor 1177 may also include instructions 1179a and/or data 1181a from memory 1183 that were loaded for execution or processing by the processor 1177. The instructions 1179b may be executed by the processor 1177 to implement one or more of the methods 300 and 900 described above.

The eNB 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180a-n are attached to the housing and electrically coupled to the transceiver 1176.

The various components of the eNB 1160 are coupled together by a bus system 1185, which may include a power bus, a control signal bus and a status signal bus, in addition to a data bus. However, for the sake of clarity, the various buses are illustrated in FIG. 11 as the bus system 1185. The eNB 1160 may also include a digital signal processor (DSP) 1187 for use in processing signals. The eNB 1160 may also include a communications interface 1189 that provides user access to the functions of the eNB 1160. The eNB 1160 illustrated in FIG. 11 is a functional block diagram rather than a listing of specific components.

Figure 12:
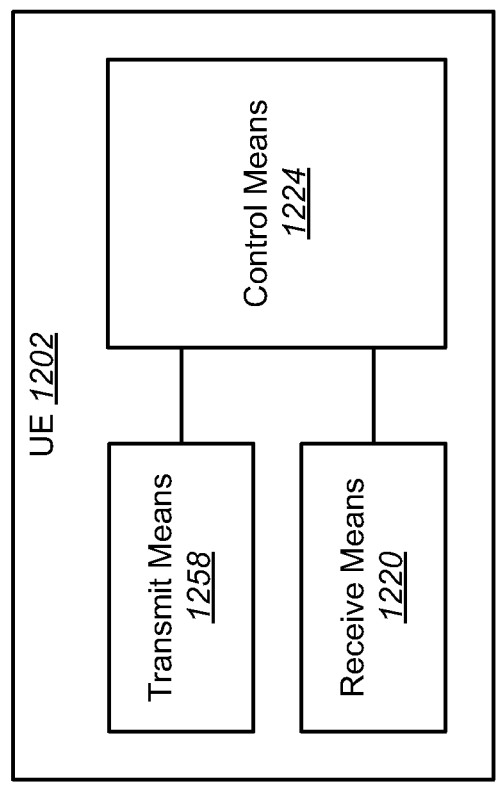
FIG. 12 is a block diagram illustrating one configuration of a UE in which systems and methods for performing carrier aggregation may be implemented.

FIG. 12 is a block diagram illustrating one configuration of a UE 1202 in which systems and methods for performing carrier aggregation may be implemented. The UE 1202 includes transmit means 1258, receive means 1220 and control means 1224. The transmit means 1258, receive means 1220 and control means 1224 may be configured to perform one or more of the functions described in connection with FIG. 2, FIG. 8 and FIG. 10 above. FIG. 10 above illustrates one example of a concrete apparatus structure of FIG. 12. Other various structures may be implemented to realize one or more of the functions of FIG. 2, FIG. 8 and FIG. 10. For example, a DSP may be realized by software.

Figure 13:
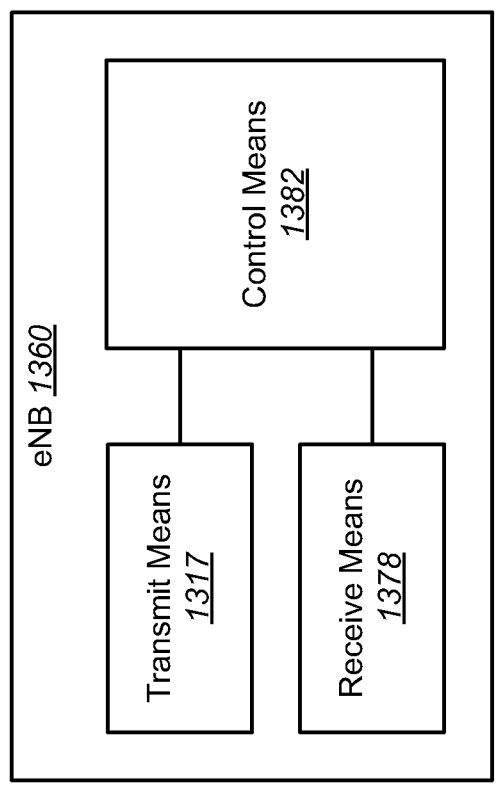
FIG. 13 is a block diagram illustrating one configuration of an eNB in which systems and methods for performing carrier aggregation may be implemented.

FIG. 13 is a block diagram illustrating one configuration of an eNB 1360 in which systems and methods for performing carrier aggregation may be implemented. The eNB 1360 includes transmit means 1317, receive means 1378 and control means 1382. The transmit means 1317, receive means 1378 and control means 1382 may be configured to perform one or more of the functions described in connection with FIG. 3, FIG. 9 and FIG. 11 above. FIG. 11 above illustrates one example of a concrete apparatus structure of FIG. 13. Other various structures may be implemented to realize one or more of the functions of FIG. 3, FIG. 9 and FIG. 11. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment (UE) for performing carrier aggregation, comprising:
a processor;
memory in electronic communication with the processor, wherein instructions stored in the memory are executable to:
determine an uplink control information (UCI) transmission cell in a wireless communication network with at least one frequency-division duplexing (FDD) cell and at least one time-division duplexing (TDD) cell;
select a first cell for FDD and TDD carrier aggregation;
determine a set of downlink subframe associations for the first cell that indicate at least one UCI transmission uplink subframe of the UCI transmission cell; and
send Physical Downlink Shared Channel (PDSCH) Hybrid Automatic Repeat Request Acknowledgement/Negative Acknowledgement (HARQ-ACK) information in the UCI transmission uplink subframe of the UCI transmission cell.

2. The UE of claim 1, wherein the instructions are further executable to determine a PDSCH scheduling for the first cell.

3. The UE of claim 2, wherein the PDSCH scheduling comprises cross-carrier scheduling, and wherein the scheduling of the first cell is based on a scheduling cell timing.

4. The UE of claim 3, wherein the PDSCH scheduling for the first cell occurs in a downlink allocation subframe of the scheduling cell, and wherein the scheduling cell is a TDD cell.

5. The UE of claim 1, wherein the instructions are further executable to determine a Physical Uplink Shared Channel (PUSCH) scheduling and PUSCH HARQ-ACK associations for the first cell.

6. The UE of claim 1, wherein the set of downlink subframe associations for the first cell comprises a PDSCH association timing of the UCI transmission cell, and wherein the UCI transmission cell is a FDD cell and the first cell is a TDD cell.

7. The UE of claim 1, wherein determining the set of downlink subframe associations for the first cell comprises maintaining a PDSCH association timing of the first cell, and wherein the UCI transmission cell is a FDD cell and the first cell is a TDD cell.

8. The UE of claim 1, wherein the instructions are further executable to determine a primary cell (PCell), wherein the PCell is a TDD cell and the UCI transmission cell is a reference cell, and wherein the reference cell is a FDD cell.

9. The UE of claim 1, wherein the instructions are further executable to:
determine a second UCI transmission cell for UCI transmission, wherein the UCI transmission cell and second UCI transmission cell utilize different duplexing; and
send PDSCH HARQ-ACK information in the UCI transmission uplink subframe of the UCI transmission cell, wherein the PDSCH HARQ-ACK information for the FDD cell is sent by the UCI transmission cell and the PDSCH HARQ-ACK information for the TDD cell is sent by the second UCI transmission cell.

10. The UE of claim 1, wherein the PDSCH HARQ-ACK information is sent on one of a Physical Uplink Control Channel (PUCCH) or a Physical Uplink Shared Channel (PUSCH).

11. An evolved Node B (eNB) for performing carrier aggregation, comprising:
a processor;
memory in electronic communication with the processor, wherein instructions stored in the memory are executable to:
determine an uplink control information (UCI) transmission cell in a wireless communication network with at least one frequency-division duplexing (FDD) cell and at least one time-division duplexing (TDD) cell;
select a first cell for FDD and TDD carrier aggregation;
determine a set of downlink subframe associations for the first cell that indicate at least one UCI transmission uplink subframe of the UCI transmission cell; and
receive Physical Downlink Shared Channel (PDSCH) Hybrid Automatic Repeat Request Acknowledgement/Negative Acknowledgement (HARQ-ACK) information in the UCI transmission uplink subframe of the UCI transmission cell.

12. The eNB of claim 11, wherein the instructions are further executable to determine a PDSCH scheduling for the first cell.

13. The eNB of claim 11, wherein the instructions are further executable to determine a Physical Uplink Shared Channel (PUSCH) scheduling and PUSCH HARQ-ACK associations for the first cell.

14. The eNB of claim 11, wherein the set of downlink subframe associations for the first cell comprises a PDSCH association timing of the UCI transmission cell, and wherein the UCI transmission cell is a FDD cell and the first cell is a TDD cell.

15. The eNB of claim 11, wherein the instructions are further executable to:
determine a second UCI transmission cell for UCI transmission, wherein the UCI transmission cell and second UCI transmission cell utilize different duplexing; and
receive PDSCH HARQ-ACK information in the UCI transmission uplink subframe of the UCI transmission cell, wherein the PDSCH HARQ-ACK information for the FDD cell is received by the UCI transmission cell and the PDSCH HARQ-ACK information for the TDD cell is received by the second UCI transmission cell.

16. A method for performing carrier aggregation by a user equipment (UE), comprising:
determining an uplink control information (UCI) transmission cell in a wireless communication network with at least one frequency-division duplexing (FDD) cell and at least one time-division duplexing (TDD) cell;
selecting a first cell for FDD and TDD carrier aggregation;

determining a set of downlink subframe associations for the first cell that indicate at least one UCI transmission uplink subframe of the UCI transmission cell; and sending Physical Downlink Shared Channel (PDSCH) Hybrid Automatic Repeat Request Acknowledgement/ Negative Acknowledgement (HARQ-ACK) information in the UCI transmission uplink subframe of the UCI transmission cell.

17. The method of claim 16, further comprising determining a PDSCH scheduling for the first cell.

18. The method of claim 17, wherein the PDSCH scheduling comprises cross-carrier scheduling, and wherein the scheduling of the first cell is based on a scheduling cell timing.

19. The method of claim 18, wherein the PDSCH scheduling for the first cell occurs in a downlink allocation subframe of the scheduling cell, and wherein the scheduling cell is a TDD cell.

20. The method of claim 16, further comprising determining a Physical Uplink Shared Channel (PUSCH) scheduling and PUSCH HARQ-ACK associations for the first cell.

21. The method of claim 16, wherein the set of downlink subframe associations for the first cell comprises a PDSCH association timing of the UCI transmission cell, and wherein the UCI transmission cell is a FDD cell and the first cell is a TDD cell.

22. The method of claim 16, wherein determining the set of downlink subframe associations for the first cell comprises maintaining a PDSCH association timing of the first cell, and wherein the UCI transmission cell is a FDD cell and the first cell is a TDD cell.

23. The method of claim 16, further comprising determining a primary cell (PCell), wherein the PCell is a TDD cell and the UCI transmission cell is a reference cell, and wherein the reference cell is a FDD cell.

24. The method of claim 16, further comprising:
determining a second UCI transmission cell for UCI transmission, wherein the UCI transmission cell and second UCI transmission cell utilize different duplexing; and
sending PDSCH HARQ-ACK information in the UCI transmission uplink subframe of the UCI transmission cell, wherein the PDSCH HARQ-ACK information for the FDD cell is sent by the UCI transmission cell and the PDSCH HARQ-ACK information for the TDD cell is sent by the second UCI transmission cell.

25. The method of claim 16, wherein the PDSCH HARQ-ACK information is sent on one of a Physical Uplink Control Channel (PUCCH) or a Physical Uplink Shared Channel (PUSCH).

26. A method for performing carrier aggregation by an evolved Node B (eNB), comprising:
determining an uplink control information (UCI) transmission cell in a wireless communication network with at least one frequency-division duplexing (FDD) cell and at least one time-division duplexing (TDD) cell;
selecting a first cell for FDD and TDD carrier aggregation;
determining a set of downlink subframe associations for the first cell that indicate at least one UCI transmission uplink subframe of the UCI transmission cell; and
receiving Physical Downlink Shared Channel (PDSCH) Hybrid Automatic Repeat Request Acknowledgement/ Negative Acknowledgement (HARQ-ACK) information in the UCI transmission uplink subframe of the UCI transmission cell.

27. The method of claim 26, further comprising determining a PDSCH scheduling for the first cell.

28. The method of claim 26, further comprising determining a Physical Uplink Shared Channel (PUSCH) scheduling and PUSCH HARQ-ACK associations for the first cell.

29. The method of claim 26, wherein the set of downlink subframe associations for the first cell comprises a PDSCH association timing of the UCI transmission cell, and wherein the UCI transmission cell is a FDD cell and the first cell is a TDD cell.

30. The method of claim 26, further comprising:
determining a second UCI transmission cell for UCI transmission, wherein the UCI transmission cell and second UCI transmission cell utilize different duplexing; and
receiving PDSCH HARQ-ACK information in the UCI transmission uplink subframe of the UCI transmission cell, wherein the PDSCH HARQ-ACK information for the FDD cell is received by the UCI transmission cell and the PDSCH HARQ-ACK information for the TDD cell is received by the second UCI transmission cell.

* * * * *